United States Patent
Furcoiu

(12) 
(10) Patent No.: US 12,305,788 B2
(45) Date of Patent: May 20, 2025

(54) STENT SPRING FOR PIPE REPAIR DEVICE

(71) Applicant: Mueller International, LLC, Atlanta, GA (US)

(72) Inventor: Aurelian Ioan Furcoiu, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/371,728

(22) Filed: Sep. 22, 2023

(65) Prior Publication Data

US 2024/0011591 A1 Jan. 11, 2024

Related U.S. Application Data

(63) Continuation of application No. 16/987,106, filed on Aug. 6, 2020, now Pat. No. 11,802,646.

(60) Provisional application No. 62/885,021, filed on Aug. 9, 2019.

(51) Int. Cl.
*F16L 55/163* (2006.01)
*F16J 15/02* (2006.01)

(52) U.S. Cl.
CPC .......... *F16L 55/163* (2013.01); *F16J 15/028* (2013.01)

(58) Field of Classification Search
CPC .......... A61F 2002/077; A61F 2002/823; A61F 2002/825; A61F 2/844; A61F 2002/91583; E21B 43/108; F16B 2/04; F16B 7/0446; F16J 15/028; F16L 33/213; F16L 55/16; F16L 55/162; F16L 55/163; F16F 1/028
USPC .................................................... 138/98, 119
See application file for complete search history.

(56) References Cited

U.S. PATENT DOCUMENTS

| | | |
|---|---|---|
| 600,961 A | 3/1898 | Burnett |
| 2,616,736 A | 11/1952 | Smith |
| 3,149,646 A | 9/1964 | Xenis |

(Continued)

FOREIGN PATENT DOCUMENTS

| | | |
|---|---|---|
| DE | 202007004631 | 8/2008 |
| EP | 0239930 | 10/1987 |

(Continued)

OTHER PUBLICATIONS

Braun, Clifton; Office Action for Canadian patent application No. 3,092,322, filed Nov. 30, 2018, mailed Jan. 8, 2024, 4 pgs.

(Continued)

*Primary Examiner* — Robert K Arundale
*Assistant Examiner* — Richard K. Durden
(74) *Attorney, Agent, or Firm* — Taylor English Duma LLP

(57) ABSTRACT

A stent spring for a pipe repair device includes a tubular mesh structure comprising a plurality of strands arranged to define a plurality of spring openings therebetween, the tubular mesh structure defining a circumferential spring top end and a circumferential spring bottom end opposite the circumferential spring top end, a void extending axially through the tubular mesh structure from the circumferential spring bottom end to the circumferential spring top end; a continuous top band extending partially around the circumferential spring top end of the tubular mesh structure; and a continuous bottom band extending partially around the circumferential spring bottom end of the tubular mesh structure.

11 Claims, 11 Drawing Sheets

(56) References Cited

U.S. PATENT DOCUMENTS

| | | | |
|---|---|---|---|
| 3,508,587 A * | 4/1970 | Mauch | F16L 11/121 |
| | | | 251/4 |
| 3,656,771 A | 4/1972 | Stout | |
| 3,657,744 A * | 4/1972 | Ersek | A61B 17/11 |
| | | | 623/902 |
| 3,700,265 A | 10/1972 | Dufour et al. | |
| 3,895,652 A | 7/1975 | Zach | |
| 4,346,922 A | 8/1982 | Ohtsuga et al. | |
| 4,381,020 A | 4/1983 | Daghe et al. | |
| 4,426,095 A | 1/1984 | Buttner | |
| 4,589,447 A | 5/1986 | Kane et al. | |
| 4,647,072 A | 3/1987 | Westman | |
| 4,685,704 A | 8/1987 | Kolar | |
| 4,846,482 A | 7/1989 | Blodgett et al. | |
| 4,877,030 A * | 10/1989 | Beck | A61M 25/104 |
| | | | 606/195 |
| 4,889,167 A | 12/1989 | Morris | |
| 4,927,189 A | 5/1990 | Burkit | |
| 5,035,539 A | 7/1991 | Kawafuji et al. | |
| 5,119,862 A | 6/1992 | Maimets et al. | |
| 5,351,720 A | 10/1994 | Maimets | |
| 5,354,309 A * | 10/1994 | Schnepp-Pesch | A61F 2/92 |
| | | | 606/198 |
| 5,421,955 A * | 6/1995 | Lau | C23F 1/02 |
| | | | 216/48 |
| 5,549,662 A * | 8/1996 | Fordenbacher | A61F 2/93 |
| | | | 606/198 |
| 5,593,442 A * | 1/1997 | Klein | A61F 2/91 |
| | | | 606/198 |
| 5,624,124 A | 4/1997 | Ungchusri et al. | |
| 5,662,702 A * | 9/1997 | Keranen | A61F 2/856 |
| | | | 623/1.23 |
| 5,681,345 A * | 10/1997 | Euteneuer | A61L 31/044 |
| | | | 606/198 |
| 5,759,192 A * | 6/1998 | Saunders | B23K 26/18 |
| | | | 606/195 |
| 5,810,868 A * | 9/1998 | Lashinski | A61F 2/90 |
| | | | 606/198 |
| 6,001,123 A * | 12/1999 | Lau | A61F 2/92 |
| | | | 623/1.12 |
| 6,013,854 A | 1/2000 | Moriuchi | |
| 6,027,526 A * | 2/2000 | Limon | A61F 2/915 |
| | | | 606/198 |
| 6,083,259 A * | 7/2000 | Frantzen | A61F 2/915 |
| | | | 623/1.15 |
| 6,126,206 A * | 10/2000 | Topf, Jr. | F16L 55/163 |
| | | | 285/109 |
| 6,200,336 B1 | 3/2001 | Pavcnik et al. | |
| 6,270,524 B1 | 8/2001 | Kim | |
| 6,375,677 B1 | 4/2002 | Penn et al. | |
| 6,464,723 B1 * | 10/2002 | Callol | A61F 2/91 |
| | | | 623/1.34 |
| 6,589,275 B1 | 7/2003 | Ivancev et al. | |
| 6,604,549 B2 * | 8/2003 | Gauthier | F16L 55/26 |
| | | | 138/108 |
| 6,712,556 B2 | 3/2004 | Penza | |
| 6,805,706 B2 * | 10/2004 | Solovay | A61F 2/07 |
| | | | 623/1.13 |
| 6,820,653 B1 | 11/2004 | Schempf et al. | |
| 6,827,734 B2 * | 12/2004 | Fariabi | A61M 25/0009 |
| | | | 623/1.18 |
| 7,025,580 B2 | 4/2006 | Heagy et al. | |
| 7,172,370 B2 | 2/2007 | Schmidt | |
| 7,267,141 B1 | 9/2007 | De Meyer et al. | |
| 7,331,987 B1 * | 2/2008 | Cox | A61F 2/91 |
| | | | 623/1.16 |
| 7,381,222 B2 * | 6/2008 | Pflueger | A61F 2/203 |
| | | | 623/14.11 |
| 7,647,931 B2 * | 1/2010 | Pflueger | A61F 2/203 |
| | | | 606/199 |
| 7,694,465 B2 * | 4/2010 | Pryor | B64G 1/2225 |
| | | | 138/119 |
| 7,918,882 B2 | 4/2011 | Pavcnik et al. | |
| 8,230,913 B2 | 7/2012 | Hart et al. | |
| 8,236,044 B2 * | 8/2012 | Robaina | A61F 2/915 |
| | | | 623/1.15 |
| 8,397,804 B2 | 3/2013 | Hart et al. | |
| 8,435,280 B2 * | 5/2013 | Gregorich | A61F 2/915 |
| | | | 623/1.15 |
| 8,486,131 B2 * | 7/2013 | Shalev | A61B 17/12168 |
| | | | 623/1.11 |
| 8,488,290 B2 | 7/2013 | Kauffman | |
| 8,783,297 B2 | 7/2014 | Hawwa et al. | |
| 9,052,051 B2 | 6/2015 | Maimets et al. | |
| 10,143,552 B2 | 12/2018 | Wallace et al. | |
| 10,219,808 B2 * | 3/2019 | Tihon | A61B 17/1325 |
| 10,245,167 B2 | 4/2019 | Longo | |
| 10,368,990 B2 | 8/2019 | Noe et al. | |
| 10,641,427 B2 | 5/2020 | Braun et al. | |
| 11,079,058 B2 | 8/2021 | Furcoiu | |
| 11,187,366 B2 | 11/2021 | Furcoiu | |
| 11,221,099 B2 | 1/2022 | Braun et al. | |
| 11,326,731 B2 | 5/2022 | Furcoiu | |
| 11,353,154 B2 | 6/2022 | Furcoiu | |
| 11,391,405 B2 | 7/2022 | Furcoiu | |
| 11,480,286 B2 | 10/2022 | Furcoiu | |
| 11,781,697 B2 | 10/2023 | Furcoiu | |
| 11,802,646 B2 | 10/2023 | Furcoiu | |
| 2002/0111669 A1 * | 8/2002 | Pazienza | A61F 2/915 |
| | | | 623/1.22 |
| 2002/0144822 A1 | 10/2002 | Hackworth et al. | |
| 2002/0151965 A1 * | 10/2002 | Roth | A61F 2/92 |
| | | | 623/1.2 |
| 2003/0017775 A1 | 1/2003 | Sowinski et al. | |
| 2003/0040791 A1 | 2/2003 | Oktay | |
| 2003/0225447 A1 * | 12/2003 | Majercak | A61F 2/2475 |
| | | | 623/1.13 |
| 2003/0233140 A1 | 12/2003 | Hartley et al. | |
| 2004/0010308 A1 * | 1/2004 | Zafrir-Pachter | A61F 2/82 |
| | | | 623/1.22 |
| 2004/0088043 A1 * | 5/2004 | Klein | A61F 2/915 |
| | | | 623/1.15 |
| 2004/0236398 A1 | 11/2004 | Burgmeier et al. | |
| 2005/0125053 A1 * | 6/2005 | Yachia | A61F 2/844 |
| | | | 623/1.15 |
| 2005/0212220 A1 | 9/2005 | Graham | |
| 2006/0235506 A1 * | 10/2006 | Ta | A61F 2/91 |
| | | | 623/1.16 |
| 2007/0150045 A1 * | 6/2007 | Ferrera | A61B 17/12118 |
| | | | 623/1.11 |
| 2008/0051875 A1 * | 2/2008 | Cottone | A61F 2/844 |
| | | | 623/1.49 |
| 2008/0140178 A1 | 6/2008 | Rasmussen et al. | |
| 2008/0255660 A1 | 10/2008 | Guyenot et al. | |
| 2008/0269789 A1 | 10/2008 | Eli | |
| 2009/0248132 A1 | 10/2009 | Bloom et al. | |
| 2010/0010617 A1 | 1/2010 | Goodson, IV et al. | |
| 2010/0010620 A1 * | 1/2010 | Weber | A61F 2/89 |
| | | | 623/1.3 |
| 2010/0010622 A1 * | 1/2010 | Lowe | A61F 2/915 |
| | | | 623/1.46 |
| 2010/0049313 A1 | 2/2010 | Alon et al. | |
| 2010/0145433 A1 * | 6/2010 | Anukhin | A61F 2/91 |
| | | | 623/1.15 |
| 2010/0263759 A1 | 10/2010 | Maimets et al. | |
| 2011/0264186 A1 | 10/2011 | Berglung et al. | |
| 2012/0273078 A1 | 11/2012 | Hawwa et al. | |
| 2013/0018450 A1 | 1/2013 | Hunt | |
| 2013/0131783 A1 | 5/2013 | Shalev et al. | |
| 2013/0158646 A1 | 6/2013 | Roeder | |
| 2013/0248042 A1 | 9/2013 | Charest | |
| 2016/0120638 A1 | 5/2016 | Michalak | |
| 2016/0143732 A1 | 5/2016 | Glimsdale | |
| 2016/0199085 A1 * | 7/2016 | Hong | A61M 39/02 |
| | | | 604/500 |
| 2016/0238178 A1 | 8/2016 | Urbanski | |
| 2017/0231765 A1 | 8/2017 | Desrosiers et al. | |
| 2017/0304092 A1 | 10/2017 | Hong et al. | |
| 2019/0093813 A1 | 3/2019 | Badger et al. | |
| 2019/0209350 A1 * | 7/2019 | Melsheimer | A61B 17/11 |
| 2019/0301657 A1 | 10/2019 | Braun et al. | |

(56) References Cited

U.S. PATENT DOCUMENTS

| | | | |
|---|---|---|---|
| 2020/0163759 A1* | 5/2020 | Carmi | A61F 2/91 |
| 2020/0224811 A1 | 7/2020 | Braun et al. | |
| 2020/0263823 A1 | 8/2020 | Furcoiu | |
| 2020/0292119 A1 | 9/2020 | Furcoiu | |
| 2020/0292120 A1 | 9/2020 | Furcoiu | |
| 2020/0318765 A1 | 10/2020 | Bechler | |
| 2020/0340610 A1 | 10/2020 | Furcoiu | |
| 2020/0378542 A1 | 12/2020 | Eitel | |
| 2021/0041051 A1 | 2/2021 | Furcoiu | |
| 2021/0041052 A1 | 2/2021 | Furcoiu | |
| 2021/0381637 A1 | 12/2021 | Furcoiu | |
| 2022/0228691 A1 | 7/2022 | Furcoiu | |
| 2022/0228692 A1 | 7/2022 | Furcoiu | |
| 2022/0243854 A1 | 8/2022 | Furcoiu | |
| 2023/0408018 A1 | 12/2023 | Furcoiu | |
| 2024/0011592 A1 | 1/2024 | Furcoiu | |
| 2024/0093822 A1 | 3/2024 | Furcoiu | |
| 2024/0175534 A1 | 5/2024 | Allen et al. | |
| 2025/0102098 A1 | 3/2025 | Allen | |

FOREIGN PATENT DOCUMENTS

| | | |
|---|---|---|
| EP | 0621015 | 10/1994 |
| EP | 3740157 B1 | 9/2023 |
| EP | 4223253 | 7/2024 |
| GB | 2471579 | 1/2011 |
| JP | 2005278993 | 10/2005 |
| KR | 200313867 | 5/2003 |
| KR | 1020070018627 | 2/2007 |
| KR | 100775634 | 11/2007 |
| WO | 2011001189 | 1/2011 |
| WO | 2019194870 | 10/2019 |
| WO | 2020172136 | 8/2020 |
| WO | 2020219294 | 10/2020 |

OTHER PUBLICATIONS

Braun, Clifton; Non-Final Office Action for U.S. Appl. No. 16/112,207, filed Aug. 24, 2018, mailed Nov. 5, 2019, 14 pgs.
Braun, Clifton; Notice of Allowance for U.S. Appl. No. 16/112,207, filed Aug. 24, 2018, mailed Feb. 13, 2020, 13 pgs.
Braun, Clifton; Corrected Notice of Allowance for U.S. Appl. No. 16/836,468, filed Mar. 31, 2020, mailed Aug. 31, 2021, 6 pgs.
Braun, Clifton; Non-Final Office Action for U.S. Appl. No. 16/836,468, filed Mar. 31, 2020, mailed May 20, 2021, 29 pgs.
Braun, Clifton; Notice of Allowance for U.S. Appl. No. 16/836,468, filed Mar. 31, 2020, mailed Oct. 1, 2021, 9 pgs.
Braun, Clifton; Notice of Allowance for U.S. Appl. No. 16/836,468, filed Mar. 31, 2020, mailed Aug. 12, 2021, 13 pgs.
Furcoiu, Aurelian Ioan; Examiner-Initiated Interview Summary for U.S. Appl. No. 16/845,557, filed Apr. 10, 2020, mailed Apr. 21, 2021, 2 pgs.
Furcoiu, Aurelian Ioan; Non-Final Office Action for U.S. Appl. No. 16/845,557, filed Apr. 10, 2020, mailed Aug. 17, 2021, 35 pgs.
Furcoiu, Aurelian Ioan; Notice of Allowance for U.S. Appl. No. 16/845,557, filed Apr. 10, 2020, mailed Jan. 11, 2022, 17 pgs.
Furcoiu, Aurelian Ioan; Final Office Action for U.S. Appl. No. 16/792,984, filed Feb. 18, 2020, mailed Nov. 24, 2021, 15 pgs.
Furcoiu, Aurelian Ioan; Non-Final Office Action for U.S. Appl. No. 16/792,984, filed Feb. 18, 2020, mailed May 25, 2021, 25 pgs.
Furcoiu, Aurelian Ioan; Notice of Allowance for U.S. Appl. No. 16/792,984, filed Feb. 28, 2020, mailed Jan. 31, 2022, 9 pgs.
Furcoiu, Aurelian Ioan; Requirement for Restriction/Election for U.S. Appl. No. 17/792,984, filed Feb. 18, 2020, mailed Apr. 1, 2021, 6 pgs.
Furcoiu, Aurelian Ioan; Non-Final Office Action for U.S. Appl. No. 17/727,574, filed Apr. 22, 2022, mailed Nov. 8, 2022, 31 pgs.
Furcoiu, Aurelian Ioan; Notice of Allowance for U.S. Appl. No. 17/727,574, filed Apr. 22, 2022, mailed May 25, 2023, 16 pgs.
Furcoiu, Aurelian Ioan; Corrected Notice of Allowance for U.S. Appl. No. 16/786,193, filed Feb. 10, 2020, mailed May 17, 2021, 6 pgs.
Furcoiu, Aurelian Ioan; Corrected Notice of Allowance for U.S. Appl. No. 16/786,193, filed Feb. 10, 2020, mailed Jun. 22, 2021, 6 pgs.
Furcoiu, Aurelian Ioan; Non-Final Office Action for U.S. Appl. No. 16/786,193, filed Feb. 10, 2020, mailed Feb. 4, 2021, 22 pgs.
Furcoiu, Aurelian Ioan; Notice of Allowance for U.S. Appl. No. 16/786,193, filed Feb. 10, 2020, mailed Apr. 26, 2021, 9 pgs.
Furcoiu, Aurelian Ioan; Corrected Notice of Allowance for U.S. Appl. No. 16/786,246, filed Feb. 10, 2020, mailed Aug. 31, 2021, 6 pgs.
Furcoiu, Aurelian Ioan; Corrected Notice of Allowance for U.S. Appl. No. 16/786,246, filed Feb. 10, 2020, mailed Aug. 6, 2021, 7 pgs.
Furcoiu, Aurelian Ioan; Non-Final Office Action for U.S. Appl. No. 16/786,246, filed Feb. 10, 2020, mailed Mar. 4, 2021, 21 pgs.
Furcoiu, Aurelian Ioan; Notice of Allowance for U.S. Appl. No. 16/786,246, filed Feb. 10, 2020, mailed Oct. 14, 2021, 9 pgs.
Furcoiu, Aurelian Ioan; Requirement for Restriction/Election for U.S. Appl. No. 16/786,246, filed Feb. 10, 2020, mailed Feb. 3, 2021, 6 pgs.
Furcoiu, Aurelian Ioan; Notice of Allowance for U.S. Appl. No. 17/407,374, filed Aug. 20, 2021, mailed Sep. 12, 2022, 37 pgs.
Braun, Clifton; International Preliminary Report on Patentability for PCT Application No. PCT/US18/63325, filed Nov. 30, 2018, mailed Oct. 15, 2020, 7 pgs.
Braun, Clifton; International Search Report for PCT Application No. PCT/US18/63325, filed Nov. 30, 2018, mailed Feb. 5, 2019, 8 pgs.
Braun, Cliff; Extended European Search report for application No. 18913510.6, filed Nov. 30, 2018, mailed Sep. 13, 2021, 7 pgs.
Braun, Clifton; Extended European Search Report for application No. 23179851.3, filed Nov. 30, 2018, mailed Jul. 6, 2023, 7 pgs.
Braun, Clifton; Extended European Search Report for application No. EP23204265.5, filed Nov. 30, 2018, mailed Dec. 5, 2023, 6 pgs.
Furcoiu, Aurelian Ioan; International Preliminary Report on Patentability for PCT Application No. PCT/US20/28038, filed Apr. 14, 2020, mailed Nov. 4, 2021, 8 pgs.
Furcoiu, Aurelian Ioan; International Search Report and Written Opinion for PCT Application No. PCT/US20/28038, filed Apr. 14, 2020, mailed Jun. 24, 2020, 9 pgs.
Furcoiu, Aurelian Ioan; International Preliminary Report on Patentability for PCT Application No. PCT/US20/18593, filed Feb. 18, 2020, mailed Sep. 2, 2021, 8 pgs.
Furcoiu, Aurelian Ioan; International Search Report and Written Opinion for PCT Application No. PCT/US20/18593, filed Feb. 18, 2020, mailed May 7, 2020, 9 pgs.
Furcoiu, Aurelian Ioan; Extended European Search Report for application No. 20758706.4, filed Feb. 18, 2020, mailed Nov. 16, 2022, 9 pgs.
Furcoiu, Aurelian Ioan; Extended European Search Report for application No. 22204247.5, filed Feb. 18, 2020, mailed Jan. 5, 2023, 7 pgs.
Furcoiu, Aurelian Ioan; Non-Final Office Action for U.S. Appl. No. 16/987,106, filed Aug. 6, 2020, mailed Mar. 27, 2023, 61 pgs.
Furcoiu, Aurelian Ioan; Notice of Allowance for U.S. Appl. No. 16/987,106, filed Aug. 6, 2020, mailed Jun. 22, 2023, 9 pgs.
Furcoiu, Aurelian Ioan; Requirement for Restriction/Election for U.S. Appl. No. 16/987,106, filed Aug. 6, 2020, mailed Feb. 9, 2023, 10 pgs.
Furcoiu, Aurelian Ioan; Non-Final Office Action for U.S. Appl. No. 16/987,067, filed Aug. 6, 2020, mailed Dec. 7, 2021, 32 pgs.
Furcoiu, Aurelian Ioan; Notice of Allowance for U.S. Appl. No. 16/987,067, filed Aug. 6, 2020, mailed Apr. 5, 2022, 13 pgs.
Furcoiu, Aurelian Ioan; Office Action for European Patent Application No. 22204247.5, filed Feb. 18, 2020, mailed Aug. 9, 2024, 6 pgs.
Furcoiu, Aurelian Ioan; Requirement for Restriction/Election for U.S. Appl. No. 18/371,987, filed Sep. 22, 2023, mailed Sep. 16, 2024, 7 pgs.
Furcoiu, Aurelian Ioan; Requirement for Restriction/Election for U.S. Appl. No. 18/371,991, filed Sep. 22, 2023, mailed Sep. 16, 2024, 7 pgs.

(56) References Cited

OTHER PUBLICATIONS

Notice of Allowance for Canadian Patent Application No. 3,092,322, filed Nov. 30, 2018, mailed Feb. 6, 2025, 1 pg.
Dall'Amico, M., "Communication Under Rule 71(3) Intention to Grant" for European Patent Application No. 23204265.5, filed Nov. 30, 2018, mailed Nov. 19, 2024, 27 pgs.
Furcoiu, Aurelian Ioan; Non-Final Office Action for U.S. Appl. No. 18/371,987, filed Sep. 22, 2023, mailed Dec. 18, 2024, 41 pgs.
Furcoiu, Aurelian Ioan; Non-Final Office Action for U.S. Appl. No. 18/371,991, filed Sep. 22, 2023, mailed Dec. 18, 2024, 48 pgs.
Allen, Sean Michael; Requirement for Restriction/Election for U.S. Appl. No. 18/072,654, filed Nov. 30, 2022, mailed Jan. 30, 2025, 8 pgs.
Allen, Sean Michael; International Search Report and Written Opinion for PCT Application No. PCT/US24/43537, filed Aug. 23, 2024, mailed Jan. 21, 2025, 16 pgs.
Furcoiu, Aurelian Ioan; Notice of Allowance for U.S. Appl. No. 18/371,987, filed Sep. 22, 2023, mailed Feb. 18, 2025, 12 pgs.
Furcoiu, Aurelian Ioan; Notice of Allowance for U.S. Appl. No. 18/371,991, filed Sep. 22, 2023, mailed Feb. 19, 2025, 7 pgs.

* cited by examiner

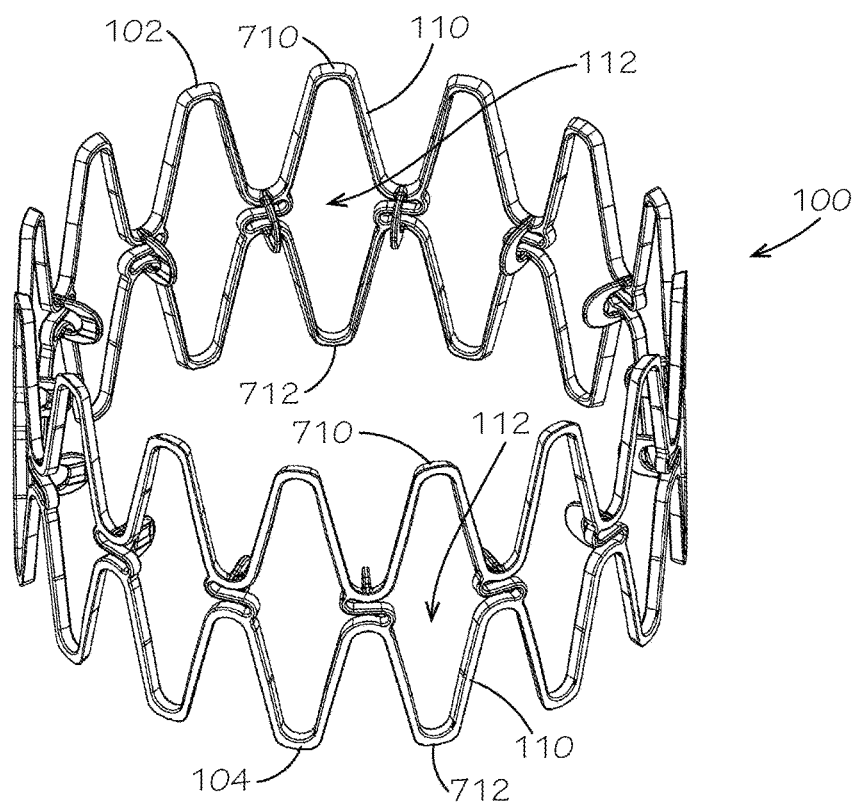
FIG. 7
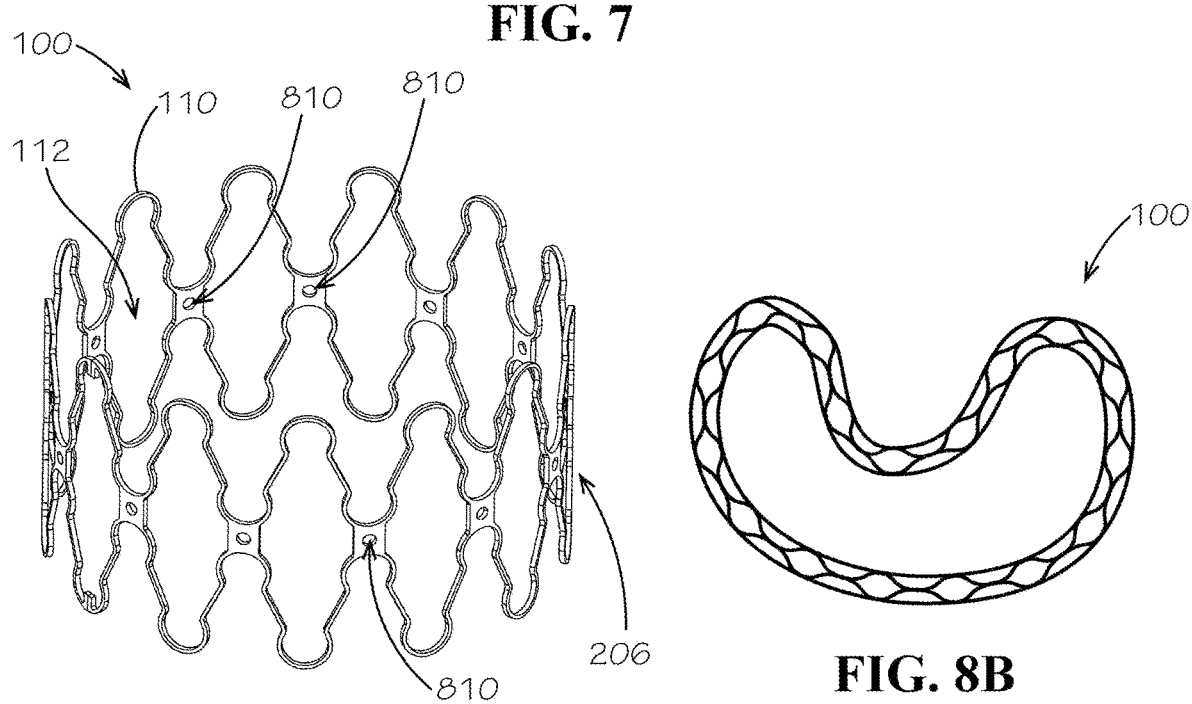
FIG. 8A
FIG. 8B

STENT SPRING FOR PIPE REPAIR DEVICE

CROSS-REFERENCE TO RELATED APPLICATIONS

The present application is a continuation of U.S. application Ser. No. 16/987,106, filed Aug. 6, 2020, which claims the benefit of U.S. Provisional Application No. 62/885,021, filed Aug. 9, 2019, each of which is hereby specifically incorporated by reference herein in its entirety.

TECHNICAL FIELD

This disclosure relates to the field of pipe repair. More specifically, this disclosure relates to a pipe repair device comprising a stent for repairing a pipe.

BACKGROUND

Piping systems, including municipal water systems, can develop breaks in pipe walls that can cause leaking. Example of breaks in a pipe wall can include radial cracks, axial cracks, point cracks, etc. Repairing a break in a pipe wall often requires the piping system to be shut off, which can be inconvenient for customers and costly for providers. Further, repairs can necessitate grandiose construction, including the digging up of streets, sidewalks, and the like, which can be costly and time-consuming.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a pipe repair device comprising a gasket defining a substantially cylindrical shape, the gasket defining a gasket top end and a gasket bottom end opposite the gasket top end, a gasket outer surface, and a gasket inner surface opposite the gasket outer surface, a top annular seal oriented at the gasket top end and a bottom annular seal oriented at the gasket bottom end, wherein each of the top and bottom annular seals extend substantially radially outward from the gasket outer surface; and a spring engaging the gasket inner surface and biasing the pipe repair device to an expanded configuration, wherein the gasket, top annular seal, and bottom annular seal are configured to engage an inner wall of a pipe in the expanded configuration.

Also disclosed is a pipe repair device comprising a gasket defining a substantially cylindrical shape, the gasket defining a gasket top end and a gasket bottom end opposite the gasket top end, a gasket outer surface, and a gasket inner surface opposite the gasket outer surface, the gasket outer surface defining a plurality of raised ridges, the raised ridges extending about a circumference of the gasket outer surface; and a spring engaging the gasket inner surface, wherein the pipe repair device is configurable in an expanded configuration and one of a compressed configuration and folded configuration, and wherein the spring biases the pipe repair device to the expanded configuration.

Further, a method of repairing a pipe is disclosed, the method comprising providing a pipe repair device, the pipe repair device comprising a spring and a gasket, the gasket defining a gasket top end, a gasket bottom end, and a gasket outer surface, wherein the gasket outer surface defines a plurality of raised ridges and recessed dimples; biasing the pipe repair device to an expanded configuration with the spring inside of a pipe; and engaging the raised ridges of the gasket outer surface with an inner wall of the pipe; and creating a suction force between each of the recessed dimples and the inner wall of the pipe to retain the pipe repair device against the inner wall.

Disclosed is a stent spring for a pipe repair device comprising one or more strands defining a tubular structure, the tubular structure defining a spring top end and a spring bottom end; a top band extending around a banded portion of the tubular structure at the spring top end; and a bottom band extending around the banded portion of the tubular structure at the spring bottom end.

A stent spring for a pipe repair device is disclosed, the stent spring comprising a tubular mesh structure comprising a plurality of strands arranged to define a plurality of spring openings therebetween, the tubular mesh structure defining a circumferential spring top end and a circumferential spring bottom end opposite the circumferential spring top end, a void extending axially through the tubular mesh structure from the circumferential spring bottom end to the circumferential spring top end; a continuous top band extending partially around the circumferential spring top end of the tubular mesh structure; and a continuous bottom band extending partially around the circumferential spring bottom end of the tubular mesh structure.

Also disclosed is a stent spring for a pipe repair device comprising a tubular mesh structure comprising a plurality of strands arranged to define a plurality of spring openings therebetween, the tubular mesh structure defining a circumferential spring top end, a circumferential spring bottom end opposite the circumferential spring top end, and a middle section between the circumferential spring top end and the circumferential spring bottom end, a void extending axially through the tubular mesh structure from the circumferential spring bottom end to the circumferential spring top end; wherein a diameter of the middle section is less than a diameter of the circumferential spring top end and a diameter of the circumferential spring bottom end.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 7 is a top perspective of the stent spring according to another aspect of the present disclosure.

FIG. 8A is a top perspective of the stent spring in an expanded configuration according to another aspect of the present disclosure.

FIG. 8B is a top view of the stent spring of FIG. 8A in a folded configuration.

DETAILED DESCRIPTION

Figure 1:
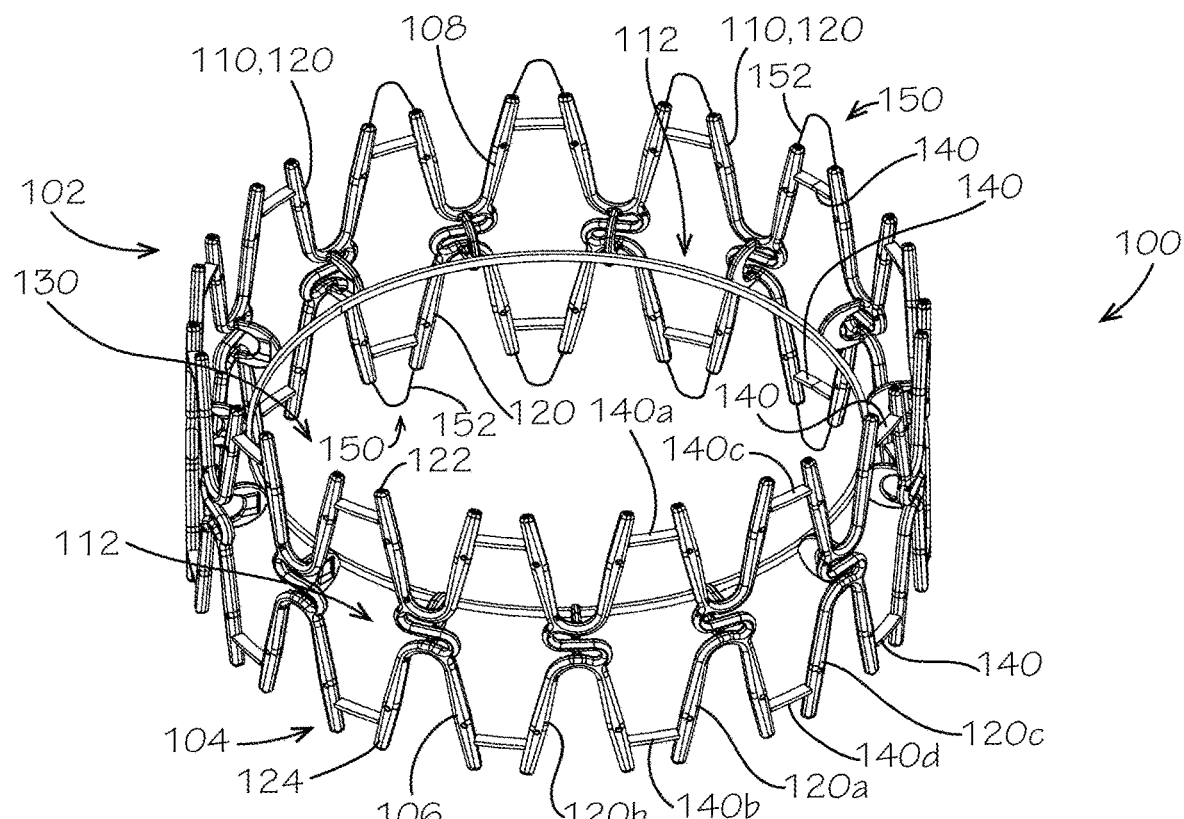
FIG. 1 is a top perspective view of a stent spring, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a stent for repairing a pipe, and associated methods, systems, devices, and various apparatus. Example aspects of the stent can be oriented in an expanded configuration and a compressed or folded configuration. Some aspects of the stent can comprise a stent spring and a gasket. It would be understood by one of skill in the art that the disclosed stent is described in but a few exemplary aspects among many. No particular terminology or description should be considered limiting on the disclosure or the scope of any claims issuing therefrom.

FIG. 1 illustrates a first aspect of a stent spring 100, according to the present disclosure. Example aspects of the stent spring 100 can define a spring force and can be expandable and compressible, such that the stent spring 100 can be oriented in an expanded configuration, as shown in FIG. 1, and a compressed configuration (not shown) or folded configuration (shown in FIG. 8B). In the depicted aspect, the stent spring 100 can comprise a plurality of strands 110 formed into a substantially cylindrical, tubular structure. The strands 110 can define a plurality of openings 112 therebetween. In a particular aspect, as shown, the strands 110 can be generally X-shaped strands 120 arranged in circular pattern. Example aspects of the strands 110 can be substantially resilient and flexible. The flexibility of the strands 110 can allow the stent spring 100 to be compressed in the compressed configuration, and the resiliency of the strands 110 can provide the stent spring 100 with the spring force, which can bias the stent spring 100 from the compressed configuration to the expanded configuration. The cylindrical, tubular structure of the stent spring 100 can define opposing open ends (e.g. a spring top end 102 and a spring bottom end 104 opposite the spring top end 102). The stent spring 100 can further define an outer surface 106 and an opposite inner surface 108. The inner surface 108 can define a void 130, which can extend between the spring top end 102 and spring bottom end 104 and can allow fluid to pass therethrough, for example, when the stent spring 100 is received in a pipeline. According to example aspects, the stent spring 100 can be formed from a metal material, such as stainless steel, spring steel, aluminum, nitinol, cobalt chromium, or any other suitable material. In other aspects, the stent spring 100 can be formed from a plastic material, such as, for example, nylon, POM (polyoxymethylene), or PVC (polyvinyl chloride). In still another aspect, the stent spring 100 can be formed from a carbon fiber material. Optionally, the material can be an NSF certified material that can comply with various public health safety standards. For example, in some aspects, the material can be approved as safe for use in drinking-water applications.

Moreover, in some aspects, the stent spring 100 can comprise a coating, such as, for example, a rubber or liquid metal coating. The coating can improve mechanical properties of the stent spring 100. For example, the coating can improve the tensile strength of the stent spring 100 by providing a flexible and/or springy outer layer. For example, in one aspect, the stent spring 100 can be coated in a Plasti Dip® coating. A Plasti Dip® coating is a synthetic rubber coating that can be applied by spraying, brushing, dipping, or the like, and which can be configured to air dry. The Plasti Dip® material can be non-slip, flexible, durable, and insulating material in some aspects. In another example aspect, the stent spring 100 can be coated in a Flex Seal® coating. The Flex Seal® coating is a synthetic rubber coating similar to the Plasti Dip® coating and can be applied by pouring, rolling, dippy, spraying, or the like, and can be durable, flexible, insulating, and water resistant. In other aspects, the coating can be any other suitable coating known in the art. As such, example aspects of the coating can be flexible and can improve the flexibility of the stent spring 100. In some example aspects, the coating can also be a non-slip coating configured to improve the grip of the stent spring 100 with any component(s) engaged by the stent spring 100, such as, for example, a gasket 1310 (shown in FIG. 13). In some aspects, the coating can also be corrosion resistant, or a separate coating can be applied for corrosion resistance. For example, a corrosion resistant coating can comprise a zinc-nickel material, phosphate, electrophoretic paint (e-coating), polyester, fusion-bonded epoxy (FBE), or any other suitable corrosion resistant material.

According to example aspects, each of the X-shaped strands 120 can be connected to the adjacent X-shaped strands 120 proximate to an upper end 122 and a lower end 124 thereof. The upper end 122 of each X-shaped strand 120 can generally correspond to the spring top end 102 of the stent spring 100, and the lower end 124 of each X-shaped strand 120 can generally correspond to the spring bottom end 104 of the stent spring 100. In the preset aspect, each of the X-shaped strands 120 can be connected to adjacent X-shaped strands 120 by one or more connecting bridges 140. For example, as shown, a first X-shaped strand 120a can be connected to an adjacent second X-shaped strand 120b proximate the upper end 122 thereof by a first connecting bridge 140a and proximate the lower end 124 thereof by a second connecting bridge 140b. The first X-shaped strand 120a can also be connected to an adjacent third X-shaped strand 120c proximate the upper end 122 thereof by a third connecting bridge 140c and proximate the lower end 124 thereof by a fourth connecting bridge 140d.

According to various example aspects, the stent spring 100 can further comprise one or more wires 150 connected to one or more of the strands 110. For example, in a particular aspect, the wires 150 can be a plurality of Nitinol super-elastic wires 152, which can be configured to provide added flexibility to the stent spring 100. In some aspects, a Nitinol super-elastic wire 152 can extend between the upper ends 122 of each adjacent X-shaped strand 120 and between the lower ends 124 of each adjacent X-shaped strands 120. Note, only a few representative Nitinol super-elastic wires 152 are illustrated in the present aspect. More or fewer wires 150 may be provided in other aspects.

Figure 13:
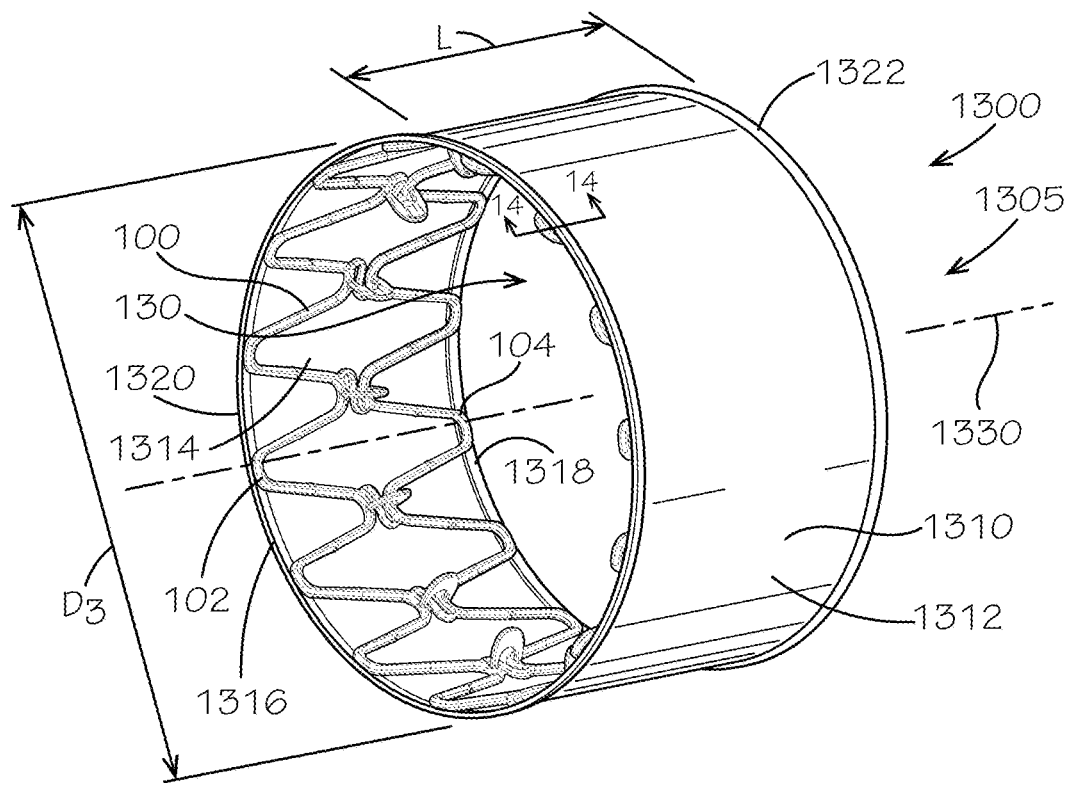
FIG. 13 is a perspective view of a stent comprising a gasket and the stent spring, in accordance with one aspect of the present disclosure.

According to example aspects, the gasket 1310 (shown in FIG. 13) can be configured to wrap around the outer surface 106 of the stent spring 100, and the gasket 1310 and stent spring 100 together can define a pipe repair device 1300 (shown in FIG. 13). The pipe repair device 1300 can be expanded within a pipe (not shown) of the pipeline such that the gasket 1310 can engage an inner wall (not shown) of the pipe where a crack or other damage is present, in order to create a watertight seal between the pipe repair device 1300 and the inner wall of the pipe to prevent leaking at the damage site. According to example aspects, the connecting bridges 140 and the wires 150 can provide added support to the gasket 1310 proximate to the spring top end 102 and spring bottom end 104, such that the gasket 1310 can be pressed firmly against the inner wall of the pipe at the connecting bridges 140. The added support for the gasket 1310 can aid in retaining the pipe repair device 1300 in place against the inner wall of the pipe by preventing the fluid flowing through the pipe from flowing between the gasket 1310 and the inner wall and pulling the pipe repair device 1300 downstream.

Figure 2:
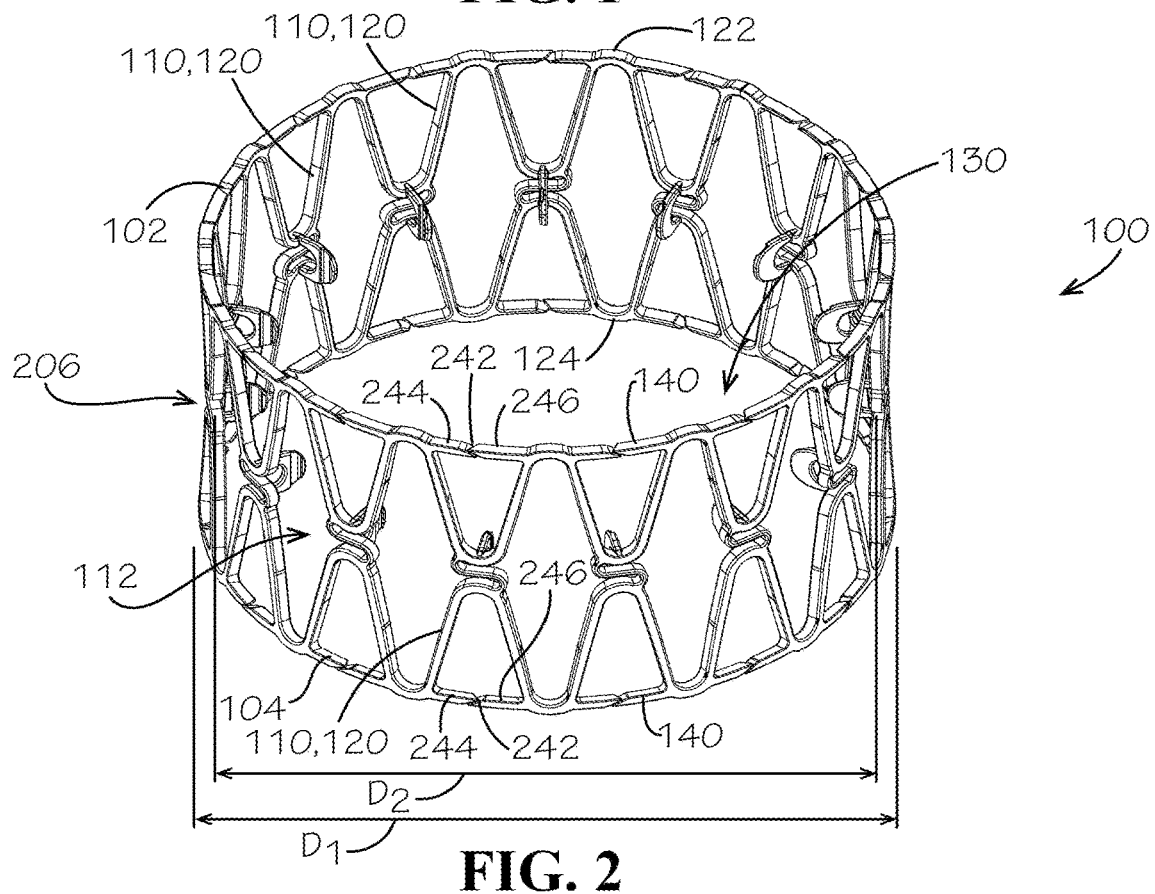
FIG. 2 is a top perspective of the stent spring according to another aspect of the present disclosure.

FIG. 2 illustrates the stent spring 100 according to another example aspect of the present disclosure. The stent spring 100 can be similar to the stent spring 100 of FIG. 1; however, in the present aspect, each of the X-shaped strands 120 can be monolithically formed with adjacent X-shaped strands 120 at the upper and lower end 122,124 thereof to define a substantially tubular mesh structure comprising the plurality of openings 112. Also, as shown, a one of the connecting bridges 140 can extend across each of the corresponding upper end 122 and lower end 124 of each X-shaped strand 120. Furthermore, each of the connecting bridges 140 of the present aspect can define a break 242 formed at a central region thereof, such that each connecting bridge 140 can define a first bridge portion 244 and a second bridge portion 246. The first bridge portion 244 can be configured to press against and slide along the second bridge portion 246 when compressed, creating additional spring force. The added spring force can aid in biasing the stent spring 100 back to the expanded configuration and in pressing the gasket 1310 (shown in FIG. 13) against the inner wall of the pipe at the spring top end 102 and spring bottom end 104.

As such, in the present aspect, the connecting bridges 140 can allow the stent spring 100 to evenly and circumferentially engage the gasket 1310 at the spring top end 102 and spring bottom end 104 and can provide added support for pressing the gasket 1310 against the inner wall of the pipe at the spring top and bottom ends 102,104. Furthermore, as illustrated in FIG. 2, in some aspects, a diameter $D_1$ of the stent spring 100 defined at the spring top end 102 and spring bottom end 104 can be greater than a diameter $D_2$ of the stent spring 100 defined at a middle section 206 thereof. The increased diameter $D_1$ at the spring top end 102 and spring bottom end 104 can increase the force with which the stent spring 100 presses the gasket 1310 into the inner wall of the pipe at the spring top and bottom ends 102,104 thereof.

Figure 3:
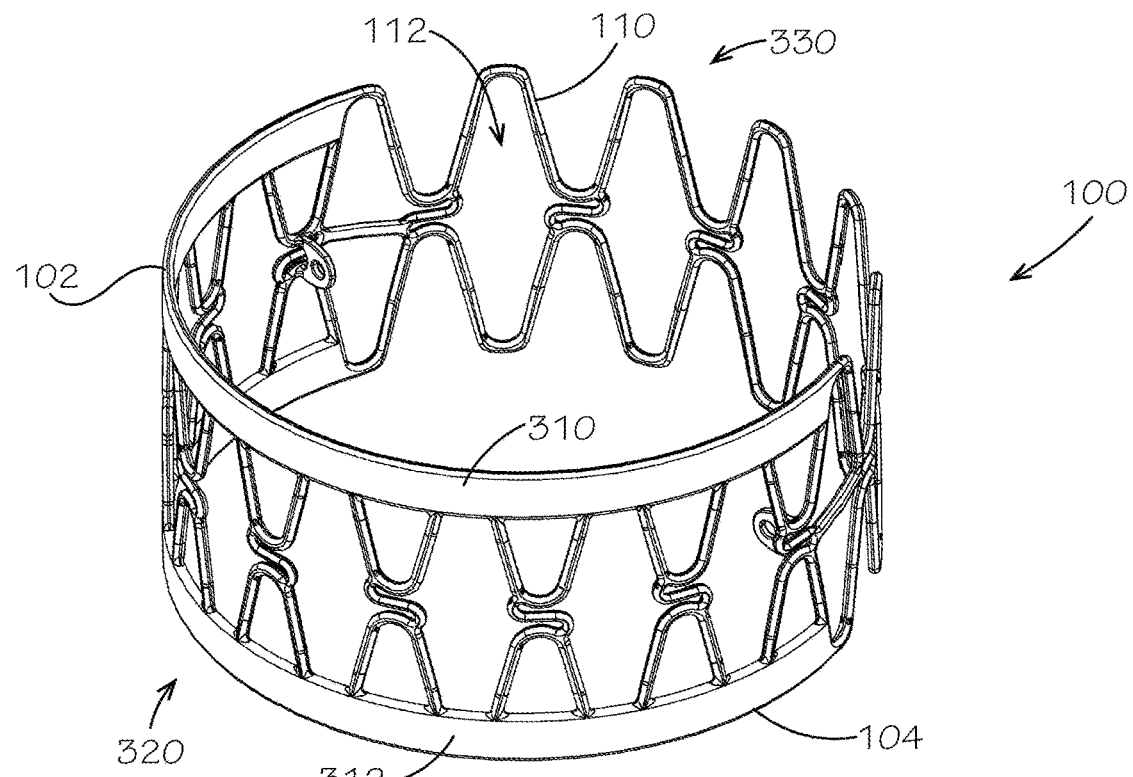
FIG. 3 is a top perspective of the stent spring according to another aspect of the present disclosure.

FIG. 3 illustrates another example aspect of the stent spring 100 according to the present disclosure. As shown, the tubular mesh structure of the stent spring 100 can comprise a plurality of the strands 110 arranged to define the openings 112 therebetween. In the present aspect, the stent spring 100 can comprise a top band 310 extending around a banded portion 320 of the circumference of the stent spring 100 at the spring top end 102 thereof, and a bottom band 312 extending around the banded portion 320 of the stent spring 100 at the spring bottom end 104 thereof. The top band 310 and bottom band 312 can be monolithically formed with the adjoining strands 110 in some aspects; however, in other aspects, the top band 310 and/or bottom band 312 can be coupled to the corresponding strands 110 by any suitable fastener, such as an adhesive, a mechanical fastener, or the like. The top band 310 and bottom band 312 can increase the resiliency of the stent spring 100 around the banded portion 320, and can aid in pressing the gasket 1310 (shown in FIG. 13) into the inner wall of the pipe at the spring top end 102 and spring bottom end 104, as described above. Furthermore, according to example aspects, an un-banded portion 330 of the circumference of the stent spring 100 around which the top band 310 and bottom band 312 do not extend can be more flexible than the banded portion 320 of the circumference, and can allow for easier compression and/or folding of the stent spring 100 at the un-banded portion 330.

Figure 4:
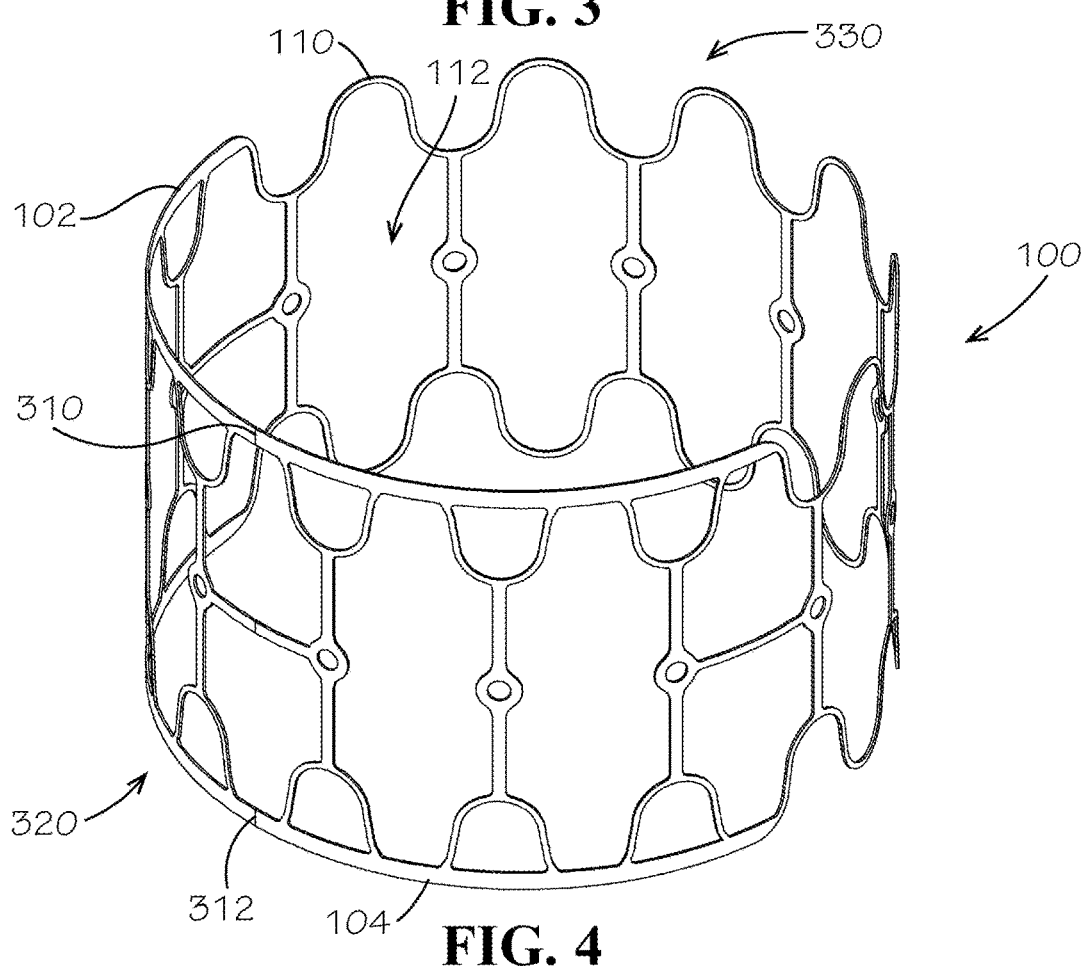
FIG. 4 is a top perspective of the stent spring according to another aspect of the present disclosure.

FIG. 4 illustrates the stent spring 100 according to another example aspect that can be similar to the stent spring 100 of FIG. 3, wherein the stent spring 100 can comprise the top band 310 and the bottom band 312 extending around the banded portion 320. The un-banded portion 330 can comprise increased flexibility over the banded portion 320, which can allow for easy folding and/or compression of the stent spring 100 at the un-banded portion 330. In the present aspect, the strands 110 of the stent spring 100 can be configured differently than the strands 110 of the stent spring 100 of FIG. 3, such that the openings 112 formed by the stands can define different shapes. The top and bottom bands 310,312 of the present aspect can also be notably thinner than the top and bottom bands 310,312 of FIG. 3.

Figure 5:
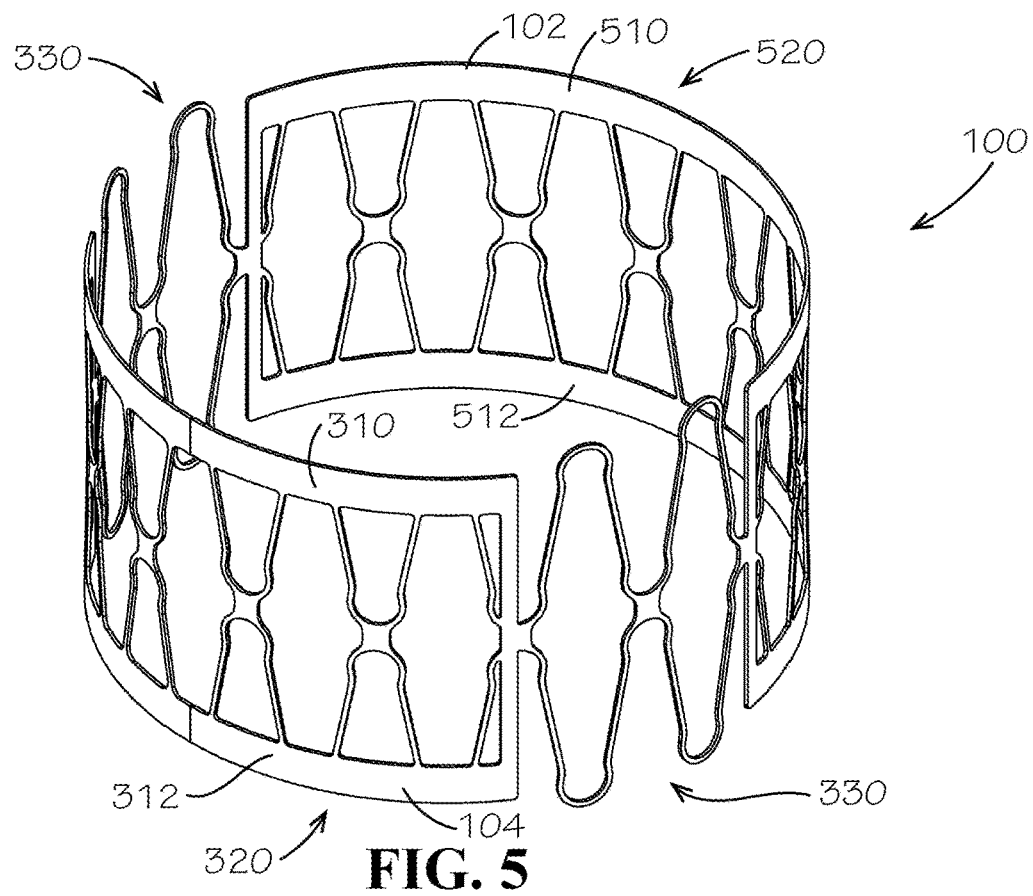
FIG. 5 is a top perspective of the stent spring according to another aspect of the present disclosure.
Figure 6:
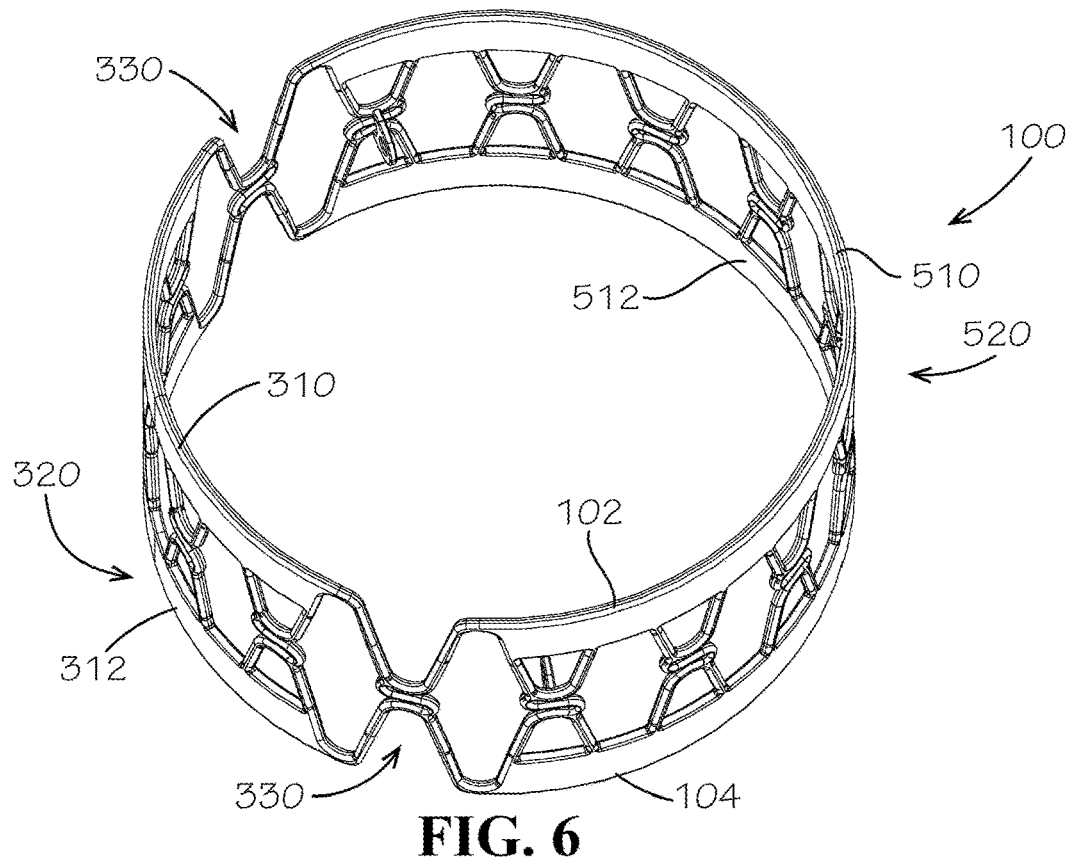
FIG. 6 is a top perspective of the stent spring according to another aspect of the present disclosure.

FIG. 5 illustrates an example aspect of the stent spring 100 that can be similar to the stent springs 100 of FIGS. 3 and 4. The stent spring 100 can comprise the top band 310 and bottom band 312 extending around the banded portion 320. However, in the current aspect, the stent spring 100 can further comprise a second top band 510 and a second bottom band 512 extending around a second banded portion 520 of the stent spring 100. As shown, un-banded portions 330 can be formed between the banded portion 320 and second banded portion 520. The un-banded portions 330 can comprise increased flexibility as opposed to the banded portion 320 and second banded portion 520, which can allow for easy folding and/or compression of the stent spring 100. FIG. 6 illustrates the stent spring 100 according to another example aspect that can be substantially similar to the stent spring 100 of FIG. 5.

FIG. 7 illustrates another example aspect of the stent spring 100, according to the present disclosure. As shown, in some aspects, the stent spring 100 may not comprise the connecting bridges 140, the wires 150, or the top and bottom bands 310,312. However, upper portions 710 and lower portions 712 of the strands 110 formed at the spring top end 102 and spring bottom end 104, respectively, can provide added support to the gasket 1310 (shown in FIG. 13) at the spring top end 102 and spring bottom end 104 to aid in retaining the pipe repair device 1300 (shown in FIG. 13) in position within the pipe.

FIG. 8A illustrates another example aspect of the stent spring 100 in accordance with the present disclosure. As shown, the stent spring 100 can define the tubular mesh structure comprising a plurality of the strands 110, and the strands 110 can define the plurality of openings 112. In the present aspect, the stent spring 100 can be monolithically formed as a singular component. For example, the stent spring 100 can be laser cut from a sheet of material, such as, for example, a sheet of stainless steel. In other aspects, the stent spring 100 can be formed by stereolithography (e.g., 3D printing), or by any other suitable manufacturing method suitable for forming the mesh structure of the stent spring 100. Moreover, in the present aspect, the stent spring 100 can be configured to be folded instead of compressed, as shown in FIG. 8B. Furthermore, as shown, a plurality of holes 810 can be formed around the circumference of the stent spring 100 at the middle section 206 thereof. According to example aspects, each of the holes 810 can be configured to receive an eye bolt (not shown) therethrough, and the eye bolt can define a loop. In other aspects, any other suitable device providing a loop can be provided. A wire, or in other aspects, a cord, thread, or the like, can be passed through the loops of the eye bolts, and a pulling force can be applied to the wire to draw the stent into the folded configuration. In other aspects, the wire (or cord, thread, or the like) can be fed directly through the holes 810, and the pulling force can be applied to the wire to draw the stent into the folded configuration. FIG. 8B illustrates a top view of the stent spring 100 in the folded configuration, in accordance with one particular aspect.

Figure 9A:
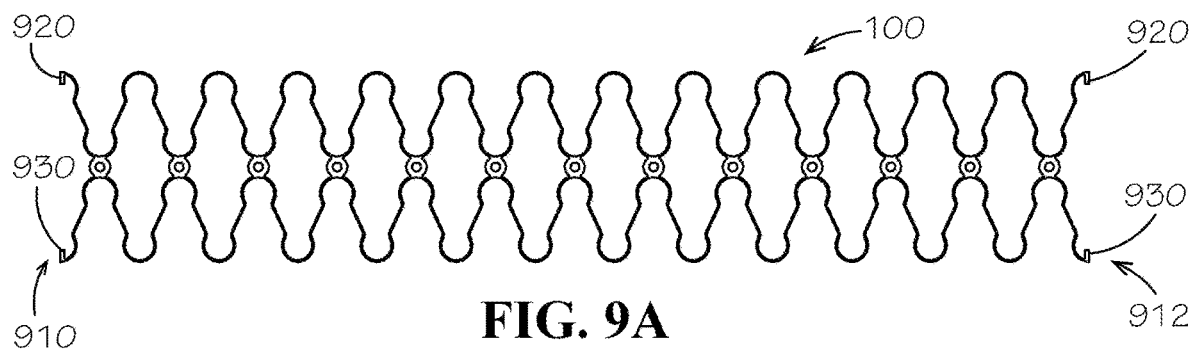
FIG. 9A is a front view of the stent spring in an unrolled configuration according to another aspect of the present disclosure.
Figure 9B:
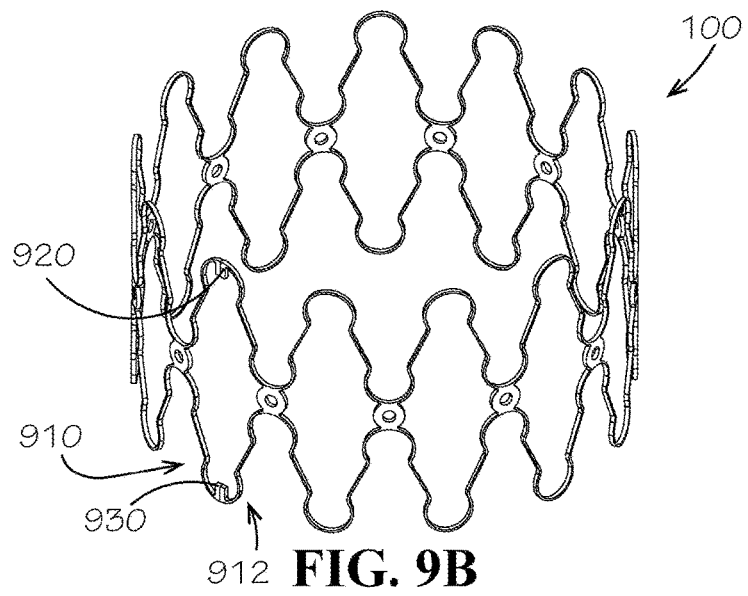
FIG. 9B is a top perspective view of the stent spring of FIG. 9A in a rolled configuration.

FIGS. 9A and 9B illustrates an example aspect of the stent spring 100 that can be substantially similar to the stent spring 100 of FIGS. 8A and 8B. In the present aspect, the stent spring 100 can be manufactured in an unrolled configuration, as shown in FIG. 9A, and can then be reconfigured into a rolled configuration, as shown in FIG. 9B, to define the substantially tubular mesh structure. Referring to FIG. 9A, the stent spring 100 can define a first side 910 and an opposite second side 912. In the present aspect, a first tab 920 and a second tab 930 can be formed at each of the first side 910 and second side 912. To retain the stent spring 100 in the rolled configuration, as shown in FIG. 9B, the first tabs 920 can be fastened to one another, such as, for example, by spot welding, and the second tabs 930 fastened to one another, such as, for example, by spot welding. In other aspects, the first side 910 of the stent spring 100 can be attached to the second side 912 by an alternative fastener, such as, for example, one or more nut and bolt assemblies, adhesives, clips, snaps, ties, or any other suitable fastener or combination of fasteners know in the art. Furthermore, according to example aspects, the rolled stent spring 100 can be heat treated to harden the stent spring 100. For example, in one particular example aspect, the stent spring 100 can be hardened to between about 40-45 HRC.

Figure 10:
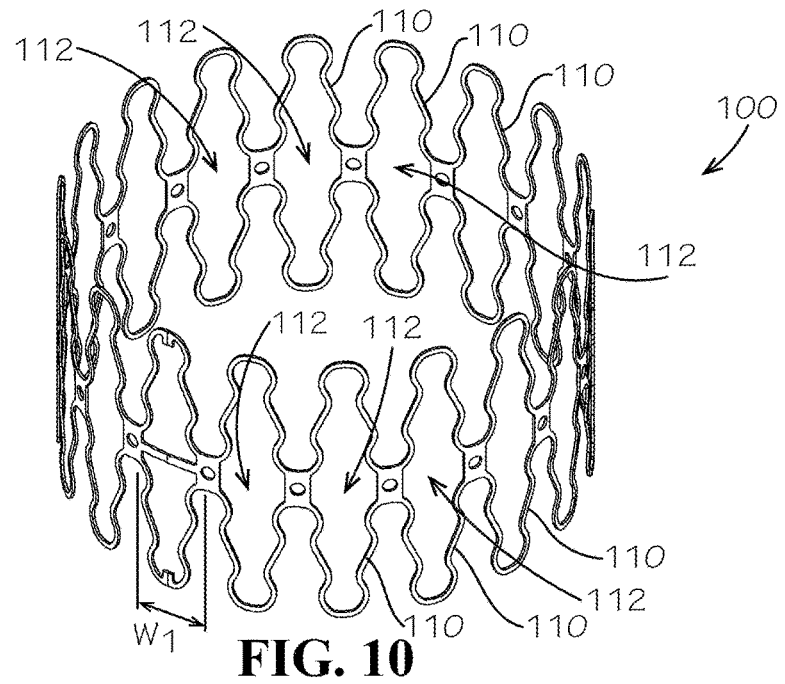
FIG. 10 is a top perspective of the stent spring according to another aspect of the present disclosure.
Figure 11:
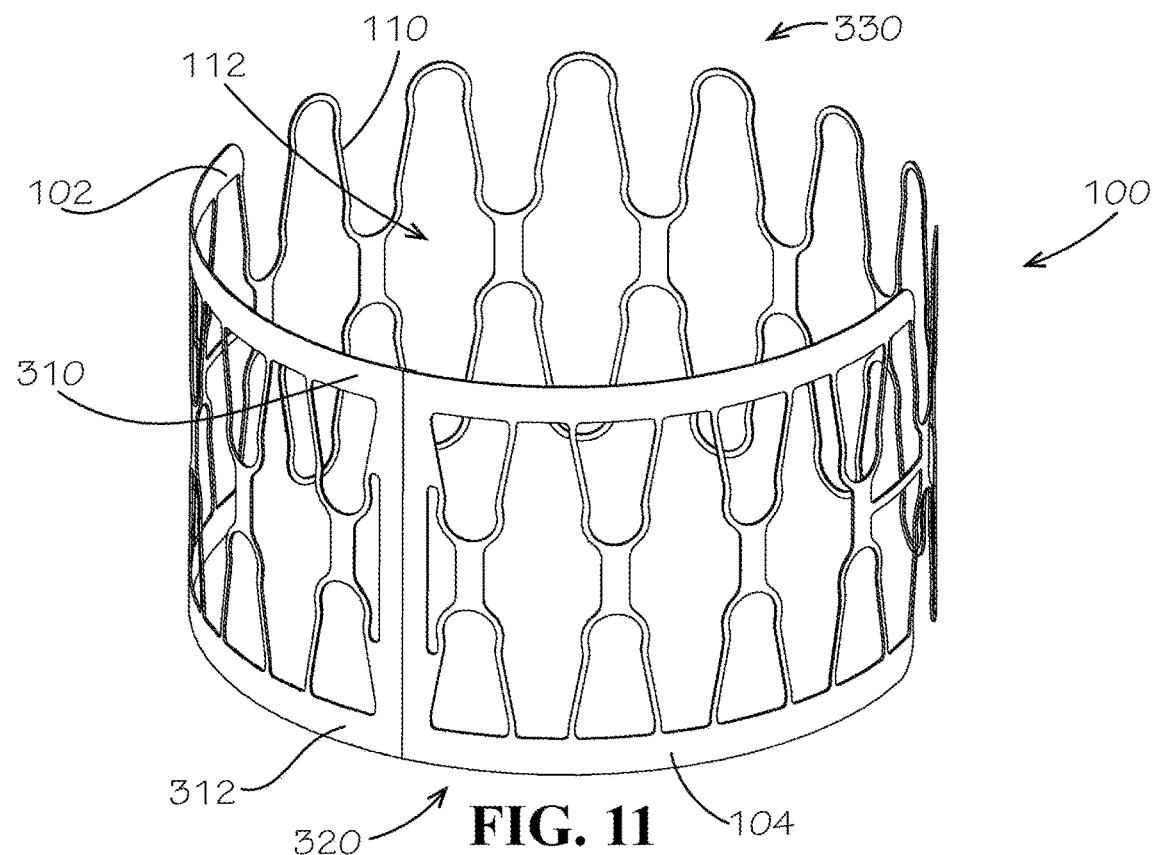
FIG. 11 is a top perspective of the stent spring according to another aspect of the present disclosure.

FIG. 10 illustrates another example aspect of the stent spring 100 that can be similar to the stent spring 100 of FIGS. 8A and 8B; however, the stent spring 100 of the present aspect can comprise a greater amount of strands 110 than the prior aspect, and thus can define more of the openings 112, as shown. The stent spring 100 of the present aspect can be substantially the same in size as compared to the prior aspect, and as such, each of the openings 112 can define a smaller width Wi than the openings 112 of the prior aspect. In some aspects, providing a stent spring 100 comprising more stands defining smaller openings 112 can increase the flexibility of the stent spring 100 and allow for easier folding and/or compression. FIG. 11 illustrates still another example aspect of the stent spring 100, wherein the size and shape of the strands 110 and openings 112 can be similar to the stent spring 100 of FIGS. 8A and 8B; however, the present aspect can further comprise the top band 310 and the bottom band 312 extending around the banded portion 320 of the stent spring 100.

Figure 12:
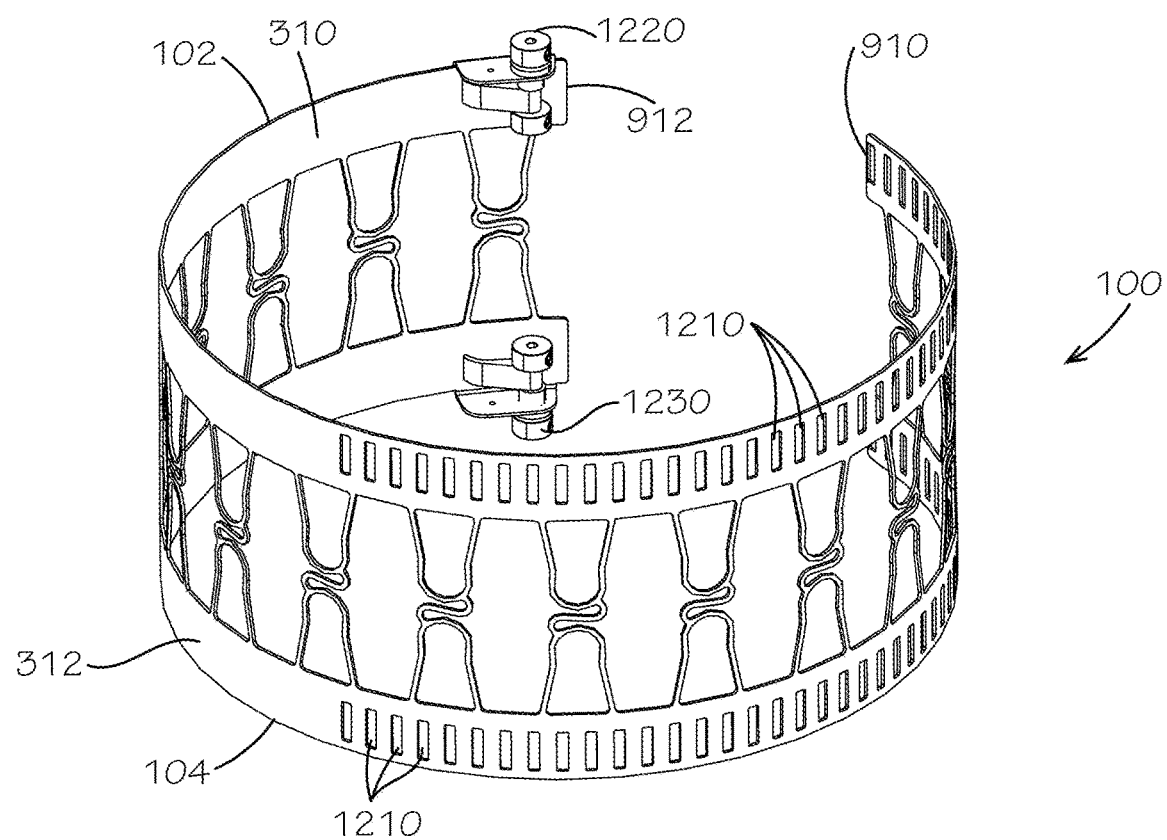
FIG. 12 is a top perspective of the stent spring according to another aspect of the present disclosure.

FIG. 12 illustrates an example aspect of the stent spring 100, according to the present disclosure, wherein the stent spring 100 can be adjustable in diameter. In the present aspect, the stent spring 100 can comprise the top band 310 extending fully about the circumference of the stent spring 100 at the spring top end 102 thereof and the bottom band 312 extending fully about the circumference at the spring bottom end 104 thereof. As shown, the stent spring 100 can define the first side 910 and the opposite second side 912. A plurality of notches 1210 can be formed along a length of the top band 310 and the bottom band 312 adjacent to the first side 910 of the stent spring 100. Each of the notches 1210 formed in the top band 310 can be configured to substantially align with a corresponding one of the notches 1210 formed in the bottom band 312. Furthermore, a top locking mechanism 1220 can be positioned at the spring top end 102 proximate to the second side 912 of the stent spring 100, and a bottom locking mechanism 1230 can be positioned at the spring bottom end 104 proximate to the second side 912. The top band 310 at the first side 910 of the stent spring 100 can be fed into the top locking mechanism 1220 and the top locking mechanism 1220 can selectively engage one of the notches 1210 in the top band 310 to define a desired diameter of the stent spring 100. Simultaneously, the bottom band 312 at the first side 910 of the stent spring 100 can be fed into the bottom locking mechanism 1230, and the bottom locking mechanism 1230 can engage the corresponding notch 1210 on the bottom band 312. To reduce the diameter of the stent spring 100, the top and bottom bands 310,312 can be fed further into the corresponding top and bottom locking mechanisms 1220,1230, respectively, and can be locked in place at the desired reduced diameter. To increase the diameter of the stent spring 100, the top and bottom bands 310,312 can be drawn further out of the corresponding top and bottom locking mechanisms 1220,1230, respectively, and locked in place at the desired increased diameter.

FIG. 13 illustrates the pipe repair device 1300 according to an example aspect of the present disclosure. The pipe repair device 1300 can be, for example, a stent 1305, as shown. According to the present aspect, the stent 1305 can comprise the stent spring 100 and the gasket 1310, and can generally define a stent diameter $D_3$ and a stent length L. A center axis 1330 of the stent 1305 can be defined through a center of the void 130. Example aspects of the gasket 1310 can be formed as a continuous, tubular sleeve structure, as shown, and can be substantially cylindrical in shape. The gasket 1310 can define an outer surface 1312 and an inner surface 1314. Example aspects of the gasket 1310 can comprise a flexible and compressible material, such as, for example, neoprene. In other aspects, the gasket 1310 can be formed from another synthetic rubber material such as EPDM rubber, natural rubber, foam, epoxy, silicone, a resin-soaked cloth, or any other suitable flexible material. In another aspect, the gasket 1310 can be formed as an uncured resin-filled sleeve, which can be cured in place with UV (ultraviolet) radiation or any other suitable type of radiation. According to example aspects, the gasket 1310 can wrap around the circumference of the stent spring 100, and the inner surface 1314 of the gasket 1310 can engage the outer surface 106 (shown in FIG. 1) of the stent spring 100. In the present aspect, the gasket 1310 can cover the entire outer surface 106 of the stent spring 100, as shown. However, in other aspects, the gasket 1310 may cover only a portion of the outer surface 106 of the stent spring 100. In still other aspects, the gasket 1310 may not wrap entirely around the circumference of the stent spring 100. In the present aspect, the gasket 1310 can fit snugly on the stent spring 100 by friction fit when the stent spring 100 is in the expanded configuration and can be secured thereto by a fastener (not shown), such as, for example, an adhesive, tie, stitching, or any other suitable fastener known in the art. Furthermore, in some example aspects, a plurality of the stents 1305 can be joined together in series in the axial direction, relative to the center axis 1330 to form a stent 1305 defining a longer stent length L for repairing larger cracks or damage in the pipeline.

Furthermore, as described above, the stent spring 100 can be expandable and compressible. As such, according to example aspects, the stent 1305 can be oriented in an expanded configuration, as shown in FIG. 13, and a compressed configuration (not shown). In example aspects, the stent spring 100 can bias the stent 1305 radially outward, relative to the center axis 1330, to the expanded configuration. According to example aspects, the stent 1305 can be expanded within the pipe (not shown) such that the gasket 1310 can engage the inner wall (not shown) of the pipe where a crack or other damage is present, in order to create a watertight seal between the stent 1305 and the inner wall of the pipe to prevent leaking at the damage site.

In the compressed configuration, a compression force (i.e., a pushing force) can be applied to the stent 1305, for example, by a compression mechanism (not shown). The compression force can overcome the spring force of the stent spring 100, and the gasket 1310 and stent spring 100 can be compressed or folded radially inward, relative to the center axis 1330, to define a smaller stent diameter $D_3$ and a smaller overall stent volume than in the expanded configuration. The reduced stent diameter $D_3$ and stent volume in the compressed configuration can allow for easier insertion of the stent 1305 into the pipe or pipeline and easier navigation of the stent 1305 through the pipe or pipeline. When the compression force is removed or reduced to less than the spring force, the stent spring 100 can bias the stent 1305 back to the expanded configuration. In other aspects, any other suitable force, such as a tension force (i.e., a pulling force), can be applied to the stent 1305 to bias the stent 1305 to the compressed configuration or folded configuration.

As shown, the gasket 1310 can define a gasket top end 1316 that can generally correspond to the spring top end 102 and a gasket bottom end 1318 that can generally correspond to the spring bottom end 104. In the present aspect, a top annular seal 1320 can be positioned at the gasket top end 1316 and a bottom annular seal 1322 can be positioned at the gasket bottom end 1318. In the present aspect, the top and bottom annular seals 1320,1322 can be formed separately from the gasket 1310 and attached thereto; however, in other aspects, the top and bottom annular seals 1320,1322 may be formed monolithically with the gasket 1310. According to example aspects, the top annular seal 1320 and bottom annular seal 1322 can provide for an improved seal between the stent 1305 and the pipe at the gasket top and bottom ends 1316,1318 (gasket bottom end 1318 shown in FIG. 13).

Figure 14:
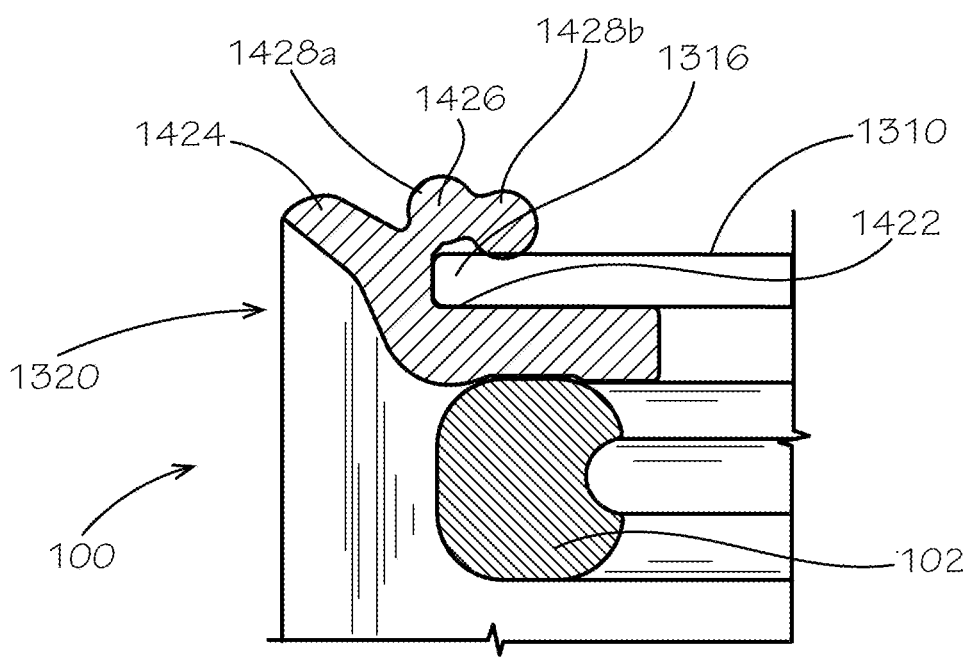
FIG. 14 is a detail cross-sectional view of the stent of FIG. 13 taken along line 14-14 in FIG. 13.

FIG. 14 illustrates a detailed cross-sectional view of top annular seal 1320 at the gasket top end 1316, which can also be representative of the bottom annular seal 1322, according to an example aspect. As shown, the top annular seal 1320 can define an annular channel 1422 for receiving the gasket top end 1316 to aid in retaining the top annular seal 1320 on the gasket 1310. In some aspects, a fastener, such as an adhesive, a mechanical fastener, or any other suitable fastener, may be provided for securing the top annular seal 1320 to the gasket 1310. In example aspects, the top annular seal 1320 can comprise a first annular sealing flange 1424 extending outwardly therefrom, relative to the center axis 1330 (shown in FIG. 13), and configured to engage and seal with the inner wall of the pipe. In the present aspect, the first annular sealing flange 1424 can be an elongated sealing fin, as shown. Other aspects of the first annular sealing flange 1424 can define any other suitable shape and size. The top annular seal 1320 can further comprise second annular sealing flange 1426 extending outwardly therefrom, relative to the center axis 1330, and configured to engage and seal with the inner wall of the pipe. In the present aspect, the second annular sealing flange 1426 can define a substantially cylindrical annular first rib 1428a coupled to the first annular sealing flange 1424 and a substantially cylindrical annular second rib 1428b coupled to the first rib 1428a, distal to the first annular sealing flange 1424. In the present aspect, the second annular sealing flange 1426 can at least partially define the annular channel 1422 and can engage the gasket top end 1316 received therein. The bottom annular seal 1322 (shown in FIG. 13) can be similarly formed. Because the top and bottom annular seals 1320,1322 can extend radially outward relative to the gasket outer surface 1312 of the gasket 1310, each of the top and bottom annular seals 1320,1322 can define a diameter than can be greater than a diameter of the gasket 1310. Additionally, as shown, the spring top end 102 and bottom spring end 104 (shown in FIG. 1) of the stent spring 100 can engage the top annular seal 1320 and bottom annular seal 1322, respectively, to aid in biasing the top and bottom annular seals 1320,1322 against the inner wall of the pipe.

Figure 15:
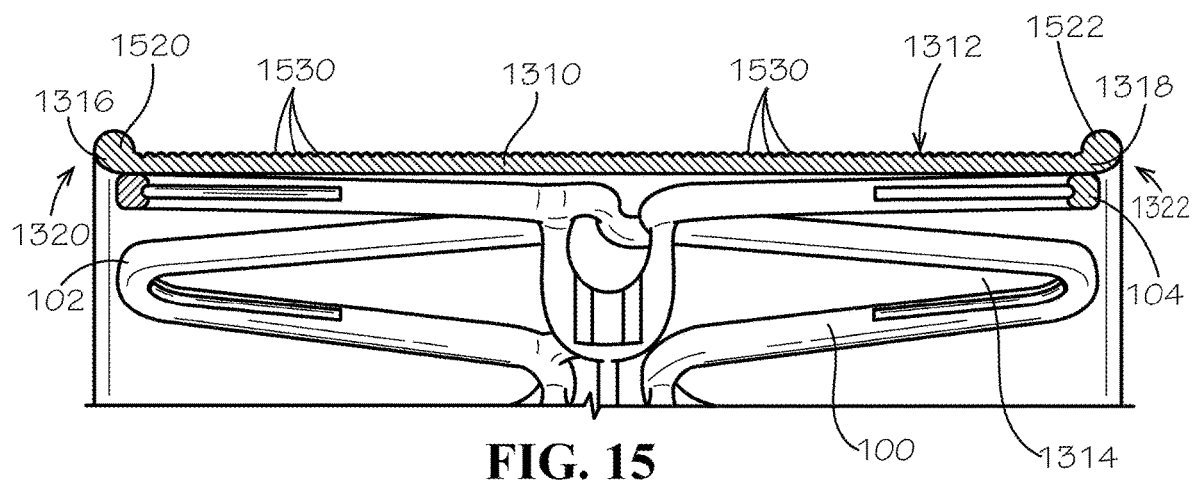
FIG. 15 is a cross-sectional view of the stent according to another aspect of the present disclosure.

FIG. 15 illustrates an example aspect of the gasket 1310 comprising the top annular seal 1320 and the bottom annular seal 1322, according to another aspect of the present disclosure. In the present aspect, the top annular seal 1320 can be a top annular lip 1520 extending substantially radially outward from the gasket 1310, relative to the center axis 1330 (shown in FIG. 13), at the gasket top end 1316, and the bottom annular seal 1322 can be a bottom annular lip 1522 extending substantially radially outward from the gasket 1310, relative to the center axis 1330, at the gasket bottom end 1318. The top and bottom annular ridges 1520,1522 can be monolithically formed with the gasket 1310 in the present aspect (i.e., formed as a single component), and each can define a substantially circular cross-sectional shape, as shown. In other aspects, the top and bottom annular ridges 1520,1522 may not be monolithically formed with the gasket 1310 and/or can comprise any other suitable cross-sectional shape. According to example aspects, the top annular lip 1520 and bottom annular lip 1522 can be configured to engage and seal with the inner wall of the pipe to improve the seal between the stent 1305 and the pipe at the gasket top end 1316 and gasket bottom end 1318.

Further, as shown, the outer surface 1312 of the gasket 1310 can be a textured outer surface 1312 in some aspects. For example, in the present aspect, the gasket 1310 can define a series of raised ridges 1530 formed on the outer surface 1312 thereof and extending circumferentially around the gasket 1310, or can otherwise define an uneven, bumpy, or rough outer surface 1312. In some example aspects, as shown, the raised ridges 1530 can be substantially concentric with the top and bottom annular lips 1520,1522. Furthermore, in the present aspect, a height of each of the raised ridges 1530 can be less than a height of the top and bottom annular lips 1520,1522; however, in other aspects, the heights of the raised ridges 1530 and the top and bottom annular lips 1520,1522 can be about equal. According to example aspects, the ridges 1530 of the gasket 1310 can be configured to engage the inner wall of the pipe and can provide an improved grip on the inner wall of the pipe when compared to a smooth outer surface 1312, particularly when gripping an uneven or rough inner wall of the pipe. In other aspects, the outer surface 1312 of the gasket 1310 can comprise an abrasive material, or can comprise projections, spikes, or grippers, or the like extending therefrom for improving the grip of the gasket 1310 on the inner wall of the pipe. Furthermore, the size, shape, and number of raised ridges 1530 can vary in example aspects.

Figure 16:
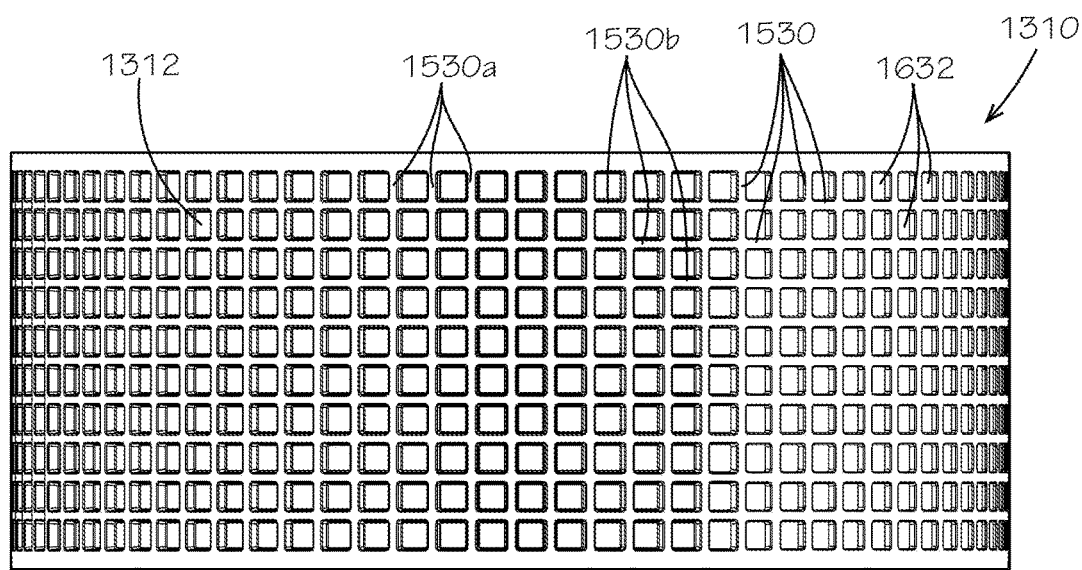
FIG. 16 is the gasket according to another aspect of the present disclosure.
Figure 17A:
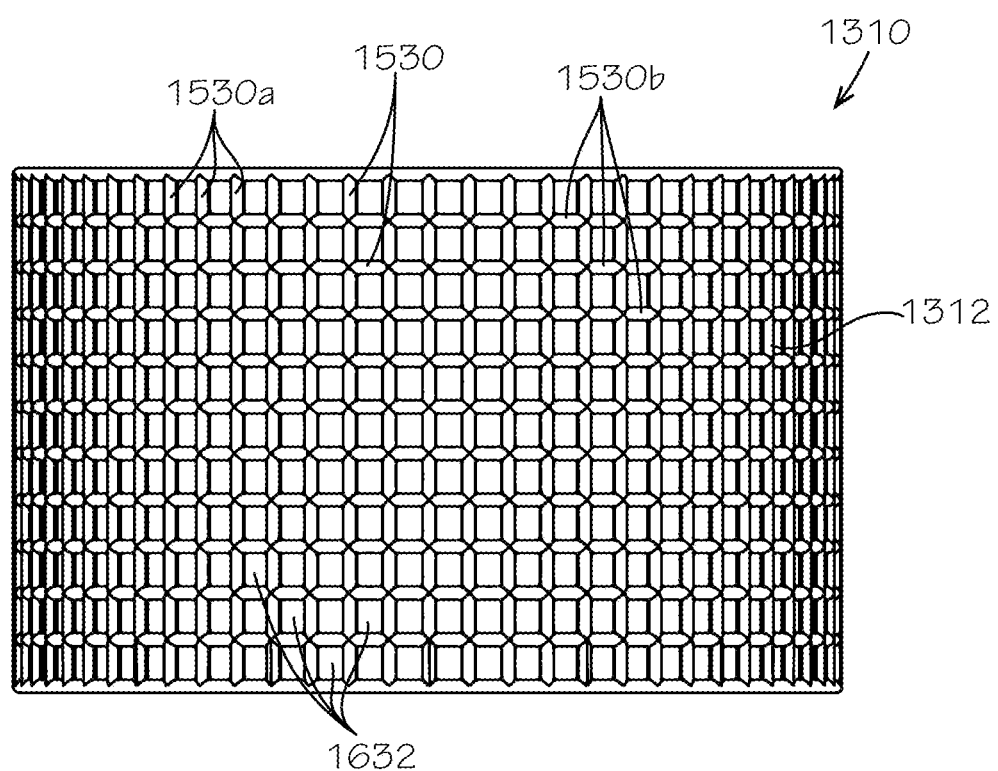
FIG. 17A is the gasket according to another aspect of the present disclosure.
Figure 17B:
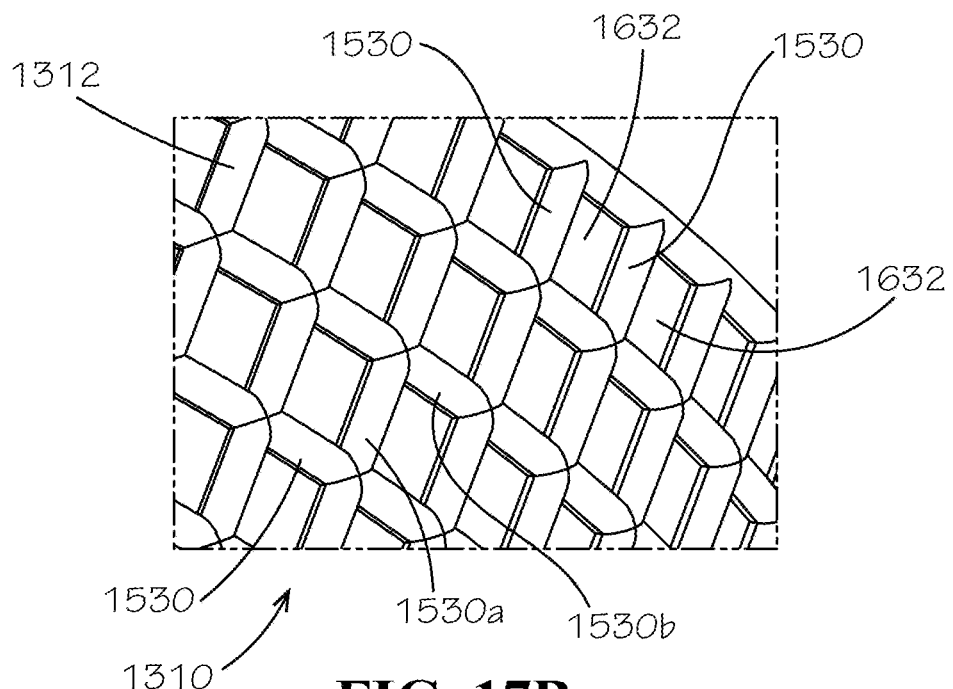
FIG. 17B is a detail view of the gasket of FIG. 17A.

FIG. 16 illustrates another example aspect of the gasket 1310 wherein the outer surface 1312 can be textured, according to the present disclosure. The gasket 1310 can comprise a plurality of the raised ridges 1530 on the outer surface 1312 thereof, wherein the raised ridges 1530 can be arranged in a crisscross pattern. As such, the ridges 1530 can comprise a plurality of generally vertical ridges 1530a, relative to the orientation shown, and a plurality of generally horizontal ridges 1530b, relative to the orientation shown, intersecting the vertical ridges 1530a. In other aspects, the raised ridges 1530 can be arranged to define any other suitable pattern. A plurality of recessed dimples 1632 can be defined between the vertical and horizontal ridges 1530a, 1530b. The recessed dimples 1632 are substantially square shaped in the present aspect, though in other aspects, the dimples 1632 can define any other suitable shape. According to example aspects, biasing the raised ridges 1530 against the inner wall of the pipe with the stent spring 100 can create a suction force within the recessed dimples 1632, which can aid in retaining the pipe repair device 1300 (shown in FIG. 13) against the inner wall. Furthermore, in the present aspect, each of the ridges 1530 can define a substantially square or rectangular profile having substantially angular edges. However, in other aspects, such as the aspect shown in FIGS. 17A and 17B, each of the ridges 1530 can be curved to define a substantially arcuate profile, as shown. In some aspects, ridges 1530 comprising a substantially arcuate profile can provide an improved grip with the inner wall of the pipe, as compared to ridges 1530 defining a substantially square or rectangular profile, as they may more easily conform to variations on the inner wall.

Figure 18:
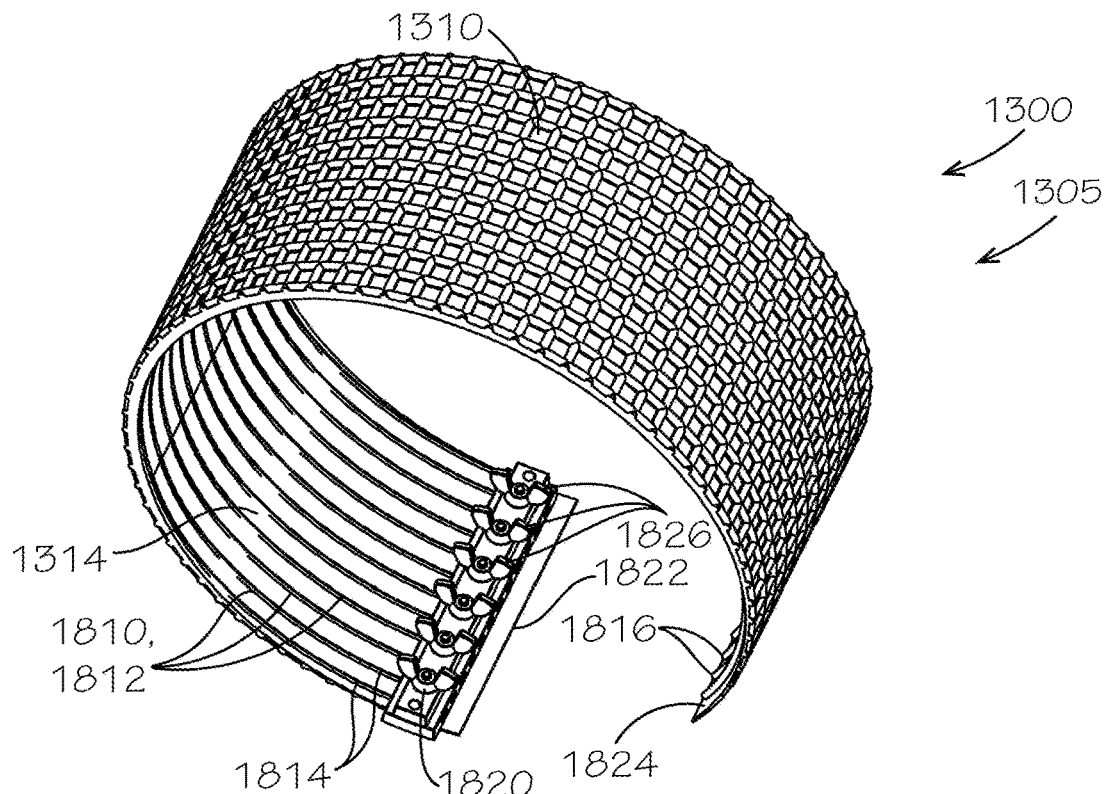
FIG. 18 is a perspective view of the stent according to another aspect of the present disclosure.

FIG. 18 illustrates another example aspect of the stent 1305 in accordance with the present disclosure. As shown, the stent 1305 can comprise the gasket 1310. In the present aspect, structural wires 1810, such as Nitinol structural wires 1812, can be embedded in, or otherwise attached to, the inner surface 1314 of the gasket 1310 to bias the stent 1305 to the expanded configuration. As such, the Nitinol structural wires 1812 can replace the stent spring 100 (shown in FIG. 1) in the present aspect. In other aspects, the structural wires 1810 can be formed from any other suitable material that can bias the stent 1305 to the expanded configuration. Furthermore, as shown, the stent 1305 can comprise a wire tightening device 1820 oriented proximate a first side 1822 of the gasket 1310, which can be opposite a second side 1824 of the gasket 1310. According to example aspects, a first end 1814 of each wire 1812 oriented proximate the first side 1822 of the gasket 1310 can be fed into a corresponding channel (not shown) in the wire tightening device 1820, and a second end 1816 of each wire 1812 oriented proximate the second side 1824 of the gasket 1310 can also be fed into the corresponding channel of the wire tightening device 1820. Once the wires 1812 are in a desired position, wing nuts 1826 provided on the wire tightening device 1820 can be tightened to engage the first and second ends 1814,1816 of each wire 1812 to lock the wires 1812 in place.

Figure 19:
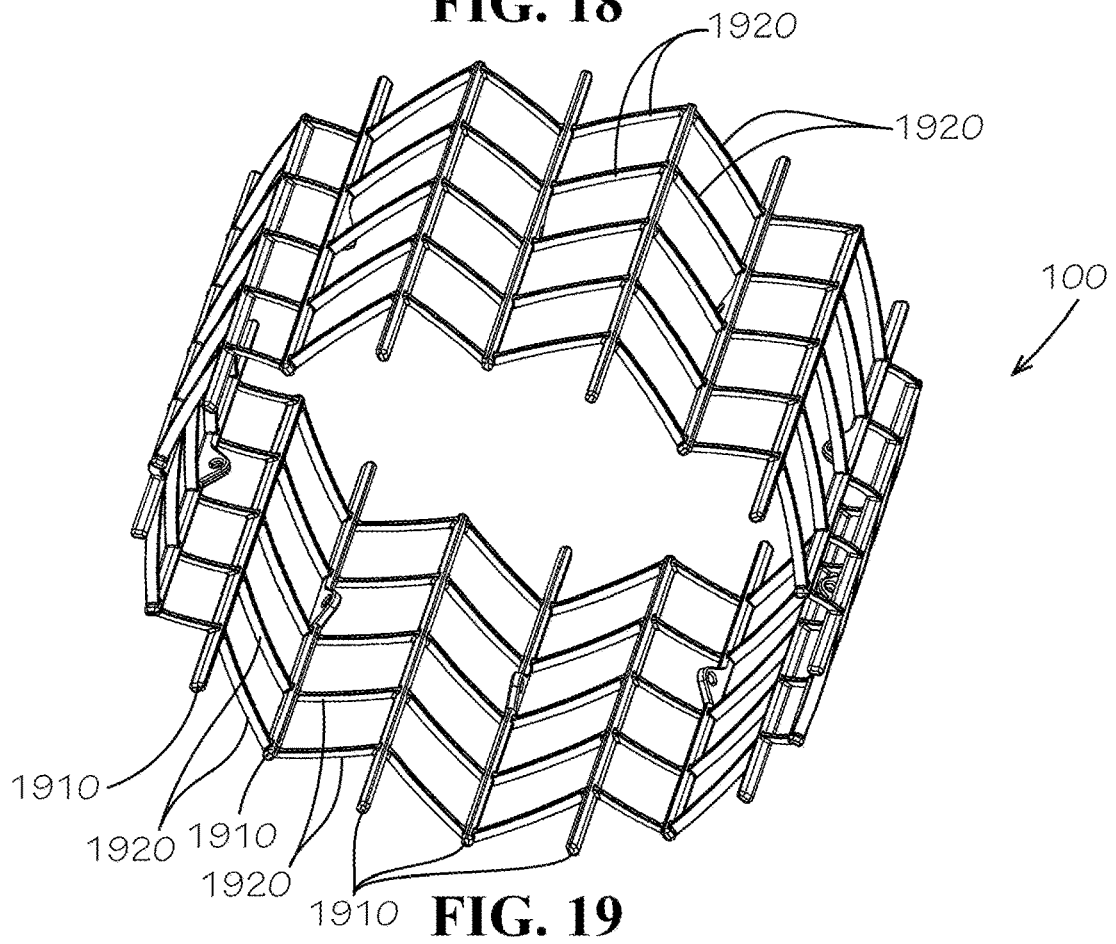
FIG. 19 is a perspective view of the stent spring according to another aspect of the present disclosure.

FIG. 19 illustrates the stent spring 100 according to another aspect of the present disclosure. The stent spring 100 of the present aspect can comprise a plurality of rods 1910 extending axially, relative to the center axis 1330 (shown in FIG. 13), about the circumference of the stent spring 100. In example aspects, a plurality of linear spring arms 1920 can extend between each of the adjacent rods 1910, with some of the spring arms 1920 angled upward and some of the spring arms 1920 angle downward, relative to the orientation shown, to define a generally chevron pattern around the circumference of the stent spring 100, as shown. According to example aspects, each of the spring arms 1920 can define a spring force configured to bias the stent spring 100 to the expanded configuration, as shown. Upon application of a suitable compression force, or other force, the spring arms 1920 can be configured to flex relative to the corresponding rods 1910 to which they are connected, allowing the stent spring 100 to be compressed to the compressed configuration. When the compression force is reduced or removed, the spring arms 1920 can bias the stent spring 100 back to the expanded configuration.

Figure 20:
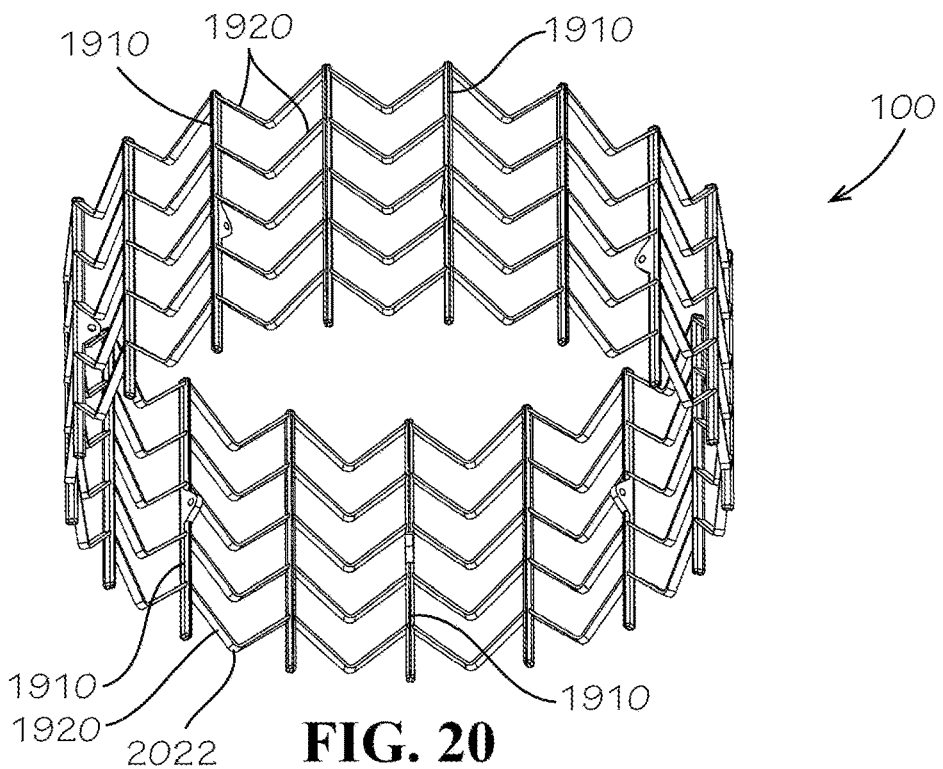
FIG. 20 is a perspective view of the stent spring according to another aspect of the present disclosure.

FIG. 20 illustrates another example aspect of the stent spring 100 in accordance with the present disclosure. The stent spring 100 of the present aspect can be similar to the stent spring 100 of FIG. 19. However, as shown, each of the spring arms 1920 extending between adjacent rods 1910 can generally define a V-shape and can be configured to pinch inward at a bottom point 2022 thereof.

Figure 21:
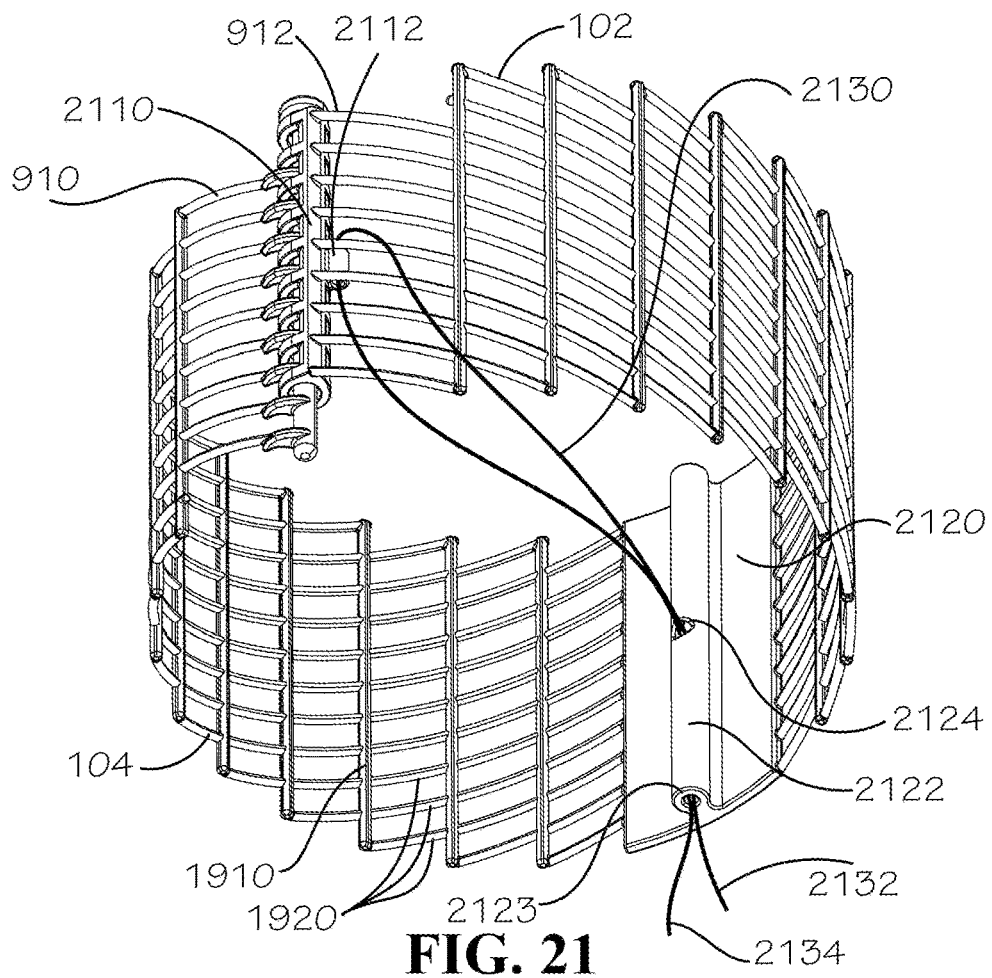
FIG. 21 is a perspective view of the stent spring according to another aspect of the present disclosure.

FIG. 21 illustrates another example aspect of the stent spring 100. The stent spring 100 of the present aspect is similar in structure to the stent spring 100 of FIG. 19; however, the present stent spring 100 is configured to be folded instead of compressed. According to example aspects, as shown, the stent spring can comprise the plurality of axially extending rods 1910 and the linear spring arms 1920 extending therebetween. The first side 910 of the stent spring 100 can be pivotably coupled to the second side 912 of the stent spring 100 by a hinge 2110. A first cable tube 2112 can be coupled to the hinge 2110. Moreover, a plate 2120 can be coupled to the stent spring 100 generally opposite the hinge 2110, and in some aspects, as shown, can extend from the spring top end 102 to the spring bottom end 104. A second cable tube 2122 can be coupled to the plate 2120 and can be oriented generally opposite the first cable tube 2112. In the present aspect, the stent spring 100 can further comprise a cable 2130 defining a first end 2132 and a second end 2134. The first end 2132 of the cable 2130 can be fed into the second cable tube 2122 through a first opening 2123 thereof, and can exit the second cable tube 2122 through a hole 2124 formed therein. The first end 2132 of the cable 2130 can then be fed through the first cable tube 2112, and then back into the second cable tube 2122 through the hole 2124, as shown. The first end 2132 of the cable 2130 can then exit the first opening 2123 of the second cable tube 2122. In order to fold the stent spring 100, a pulling force can be applied to the first and second ends 2132,2134 of the cable 2130. The first and second sides 910,910 of the stent spring 100 can pivot at the hinge 2110 as the first cable tube 2112 is drawn towards the second cable tube 2122 by the pulling force on the cable 2130. The In other aspects, the cable 2130 can be replaced with a string, cord, or any other suitable flexible strand known in the art.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A stent spring for a pipe repair device, the stent spring comprising:
    a tubular mesh structure comprising a plurality of strands arranged to define a plurality of spring openings therebetween, the tubular mesh structure defining a circumferential spring top end and a circumferential spring bottom end opposite the circumferential spring top end, a void extending axially through the tubular mesh structure from the circumferential spring bottom end to the circumferential spring top end;
    a continuous top band extending partially around the circumferential spring top end of the tubular mesh structure between at least a pair of adjacent spring openings; and
    a continuous bottom band extending partially around the circumferential spring bottom end of the tubular mesh structure between at least a pair of adjacent spring openings.

2. The stent spring of claim 1, wherein the continuous top band is axially aligned with the continuous bottom band.

3. The stent spring of claim 2, wherein a length of the continuous top band is about equal to a length of the continuous bottom band.

4. The stent spring of claim 2, wherein the continuous top band extends at least about halfway around the circumferential spring top end, and wherein the continuous bottom band extends at least about halfway around the circumferential spring bottom end.

5. The stent spring of claim 1, wherein:
    each of the continuous top band and the continuous bottom band extend about a banded portion of the tubular mesh structure opposite an un-banded portion of the tubular mesh structure; and
    a flexibility of the banded portion of the tubular mesh structure is less than a flexibility of the un-banded portion of the tubular mesh structure.

6. The stent spring of claim 5, wherein the continuous top band and the continuous bottom band are monolithically formed with the tubular mesh structure.

7. The stent spring of claim 5, wherein the continuous top band and the continuous bottom band are formed separately from and coupled to the tubular mesh structure.

8. The stent spring of claim 5, wherein
    the banded portion of the tubular mesh structure defines a first set of the plurality of spring openings that are encircled by the plurality of strands; and
    the un-banded portion of the tubular mesh structure defines a second set of the plurality of spring openings that are unenclosed at the circumferential spring top end and a third set of the plurality of spring openings that are unenclosed at the circumferential spring bottom end.

9. The stent spring of claim 1, wherein:
    the tubular mesh structure defines a middle section between the circumferential spring top end and the circumferential spring bottom end; and
    a diameter of the middle section is less than a diameter of the circumferential spring top end and a diameter of the circumferential spring bottom end.

10. The stent spring of claim 1, further comprising a structural member bridging a midsection of at least a first spring opening of the plurality of spring openings.

11. A stent spring for a pipe repair device, the stent spring comprising:
    a tubular mesh structure comprising a plurality of strands arranged to define a plurality of spring openings therebetween, the tubular mesh structure defining a circumferential spring top end and a circumferential spring bottom end opposite the circumferential spring top end, a void extending axially through the tubular mesh structure from the circumferential spring bottom end to the circumferential spring top end;
    a continuous top band extending partially around the circumferential spring top end of the tubular mesh structure, the continuous top band extending between and partially defining at least a pair of adjacent spring openings; and
    a continuous bottom band extending partially around the circumferential spring bottom end of the tubular mesh structure, the continuous bottom band extending between and partially defining at least a pair of adjacent spring openings.

* * * * *